(12) United States Patent
Cunningham

(10) Patent No.: US 8,436,519 B2
(45) Date of Patent: May 7, 2013

(54) INCANDESCENT LAMP INCORPORATING INFRARED-REFLECTIVE COATING SYSTEM, AND LIGHTING FIXTURE INCORPORATING SUCH A LAMP

(76) Inventor: David W. Cunningham, Los Angeles, CA (US)

(*) Notice: Subject to any disclaimer, the term of this patent is extended or adjusted under 35 U.S.C. 154(b) by 1215 days.

(21) Appl. No.: 11/828,276

(22) Filed: Jul. 25, 2007

(65) Prior Publication Data
US 2008/0049428 A1   Feb. 28, 2008

Related U.S. Application Data

(60) Provisional application No. 60/820,321, filed on Jul. 25, 2006, provisional application No. 60/821,109, filed on Aug. 1, 2006, provisional application No. 60/888,468, filed on Feb. 6, 2007.

(51) Int. Cl.
*H01J 5/08* (2006.01)

(52) U.S. Cl.
USPC ............................ 313/112; 313/110; 313/580

(58) Field of Classification Search ............... 313/110, 313/33, 371, 386, 385, 466, 473, 573, 518, 313/489, 479, 480, 493, 580, 635, 636, 634, 313/112, 569, 116
See application file for complete search history.

(56) References Cited

U.S. PATENT DOCUMENTS

| | | | |
|---|---|---|---|
| 4,017,758 A * | 4/1977 | Almer et al. ................ | 313/112 |
| 4,127,789 A | 11/1978 | Kostlin et al. | |
| 4,346,324 A * | 8/1982 | Yoldas ........................ | 313/112 |
| 4,467,238 A | 8/1984 | Silverstein et al. | |
| 4,507,547 A | 3/1985 | Taga et al. | |
| 4,652,789 A * | 3/1987 | Kawakatsu et al. ........ | 313/112 |
| 5,337,191 A | 8/1994 | Austin | |
| 5,473,226 A * | 12/1995 | Beschle et al. ............. | 313/580 |
| 5,500,571 A * | 3/1996 | Okada et al. ............... | 313/635 |
| 5,658,612 A * | 8/1997 | Li et al. ..................... | 427/107 |
| 5,705,882 A | 1/1998 | Oughton | |
| 5,756,192 A * | 5/1998 | Crawley et al. ............ | 428/216 |
| 5,831,375 A | 11/1998 | Benson, Jr. | |
| 5,977,694 A * | 11/1999 | McGuire .................... | 313/110 |
| 5,982,078 A | 11/1999 | Krisl et al. | |
| 6,087,775 A | 7/2000 | Levinson et al. | |
| 6,212,004 B1 | 4/2001 | Stachowiak et al. | |
| 6,417,570 B1 * | 7/2002 | Ma et al. .................... | 257/760 |
| 6,436,541 B1 | 8/2002 | Sopko et al. | |
| 6,465,959 B1 * | 10/2002 | Tian et al. .................. | 315/39 |

(Continued)

FOREIGN PATENT DOCUMENTS

| | | | |
|---|---|---|---|
| JP | 05-182646 | * | 7/1993 |
| JP | 2001176452 | | 6/2001 |
| WO | WO 86 02775 | | 5/1986 |
| WO | WO 2004 056564 | | 7/2004 |

*Primary Examiner* — Anh Mai
*Assistant Examiner* — Fatima Farokhrooz
(74) *Attorney, Agent, or Firm* — Sheppard, Mullin, Richter & Hampton LLP

(57) ABSTRACT

The present invention provides an improved lamp, and lighting fixture incorporating such a lamp, wherein the lamp's envelope includes a special optical coating system configured to more effectively reflect infrared light back toward the lamp filament, thereby enhancing the lamp's luminous efficacy. Multiple embodiments are disclosed, including coating systems deposited on one or both surfaces of the lamp envelope and including coating systems incorporating either a dielectric coating alone or specific combinations of a dielectric coating and a transparent conductive coating.

33 Claims, 21 Drawing Sheets

U.S. PATENT DOCUMENTS

| | | |
|---|---|---|
| 6,476,556 B2 | 11/2002 | Cottaar |
| 6,534,903 B1 | 3/2003 | Spiro et al. |
| 6,942,923 B2 | 9/2005 | Stachowiak |
| 7,025,859 B2 | 4/2006 | Stachowiak |
| 7,090,921 B2 | 8/2006 | Stachowiak |
| 2002/0030426 A1* | 3/2002 | Boonekamp et al. ......... 313/112 |
| 2003/0077459 A1* | 4/2003 | Vitt et al. ...................... 428/432 |
| 2003/0124392 A1* | 7/2003 | Bright .......................... 428/698 |
| 2003/0198808 A1 | 10/2003 | Muromachi et al. |
| 2004/0066136 A1* | 4/2004 | Yoneda et al. ................ 313/505 |
| 2005/0191501 A1* | 9/2005 | Lemmer et al. ............... 428/432 |

* cited by examiner

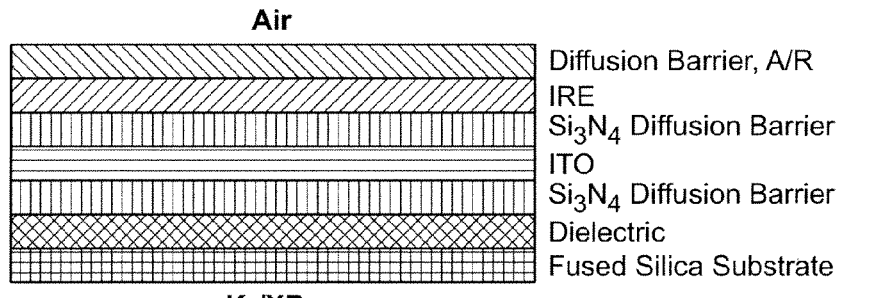

FIG. 3A

| # | Material | Thickness, nm |
|---|---|---|
|  | Fused Silica | - |
| 1 | Nb₂O₅ | 11.3 |
| 2 | SiO₂ | 40.6 |
| 3 | Nb₂O₅ | 17.8 |
| 4 | SiO₂ | 177.2 |
| 5 | Nb₂O₅ | 99.7 |
| 6 | SiO₂ | 156.8 |
| 7 | Nb₂O₅ | 90.3 |
| 8 | SiO₂ | 181.8 |
| 9 | Nb₂O₅ | 15.0 |
| 10 | SiO₂ | 183.4 |
| 11 | Nb₂O₅ | 96.2 |
| 12 | SiO₂ | 154.9 |
| 13 | Nb₂O₅ | 93.2 |
| 14 | SiO₂ | 164.4 |
| 15 | Nb₂O₅ | 112.9 |
| 16 | SiO₂ | 22.0 |
| 17 | Nb₂O₅ | 108.6 |
| 18 | SiO₂ | 169.9 |
| 19 | Nb₂O₅ | 110.1 |
| 20 | SiO₂ | 186.3 |
| 21 | Nb₂O₅ | 122.4 |
| 22 | SiO₂ | 188.0 |

} Dielectric Layers

| # | Material | Thickness, nm |
|---|---|---|
| 23 | Nb₂O₅ | 116.1 |
| 24 | SiO₂ | 188.3 |
| 25 | Nb₂O₅ | 127.5 |
| 26 | SiO₂ | 192.0 |
| 27 | Nb₂O₅ | 126.2 |
| 28 | SiO₂ | 23.2 |
| 29 | Nb₂O₅ | 127.7 |
| 30 | SiO₂ | 184.8 |
| 31 | Nb₂O₅ | 117.2 |
| 32 | SiO₂ | 205.4 |
| 33 | Nb₂O₅ | 17.4 |
| 34 | SiO₂ | 22.9 |
| 35 | Nb₂O₅ | 102.3 |
| 36 | SiO₂ | 16.8 |
| 37 | Nb₂O₅ | 20.0 |
| 38 | SiO₂ | 161.1 |
| 39 | Si₃N₄* | 20.0 |
| 40 | SWITO | 350.0 |
| 41 | Si₃N₄* | 35.0 |
| 42 | LWITO | 400.0 |
| 43 | Si₃N₄* | 50.0 |
| 44 | SiO₂ | 93.0 |
|  | Air | - |
|  | Total | 5199 |

} Dielectric Layers (23–38)
} TCC Layers (39–42)
} IRE Layers (43–44)

* Diffusion Barriers

FIG. 3B

| # | Material | Thickness, nm | | # | Material | Thickness, nm | |
|---|---|---|---|---|---|---|---|
| | Fused Silica | | | 17 | $Nb_2O_5$ | 222.9 | ⎫ |
| 1 | $Nb_2O_5$ | 103.9 | ⎫ | 18 | $SiO_2$ | 163.8 | |
| 2 | $SiO_2$ | 181.8 | | 19 | $Nb_2O_5$ | 99.6 | |
| 3 | $Nb_2O_5$ | 117.1 | | 20 | $SiO_2$ | 157.9 | |
| 4 | $SiO_2$ | 194.2 | | 21 | $Nb_2O_5$ | 91.6 | |
| 5 | $Nb_2O_5$ | 114.4 | | 22 | $SiO_2$ | 169.2 | Dielectric Layers |
| 6 | $SiO_2$ | 172.0 | | 23 | $Nb_2O_5$ | 112.6 | |
| 7 | $Nb_2O_5$ | 78.8 | | 24 | $SiO_2$ | 332.6 | |
| 8 | $SiO_2$ | 166.7 | Dielectric Layers | 25 | $Nb_2O_5$ | 117.7 | |
| 9 | $Nb_2O_5$ | 112.8 | | 26 | $SiO_2$ | 196.9 | |
| 10 | $SiO_2$ | 187.7 | | 27 | $Nb_2O_5$ | 265.3 | ⎭ |
| 11 | $Nb_2O_5$ | 126.7 | | 28 | $Al_2O_3$* | 138.6 | ⎫ |
| 12 | $SiO_2$ | 191.3 | | 29 | SWFTO | 400.0 | TCC Layers |
| 13 | $Nb_2O_5$ | 108.9 | | 30 | $Al_2O_3$* | 100.0 | ⎭ |
| 14 | $SiO_2$ | 348.6 | | 31 | LWFTO | 300.0 | ⎫ |
| 15 | $Nb_2O_5$ | 109.6 | | 32 | $Al_2O_3$* | 100.0 | IRE Layers |
| 16 | $SiO_2$ | 171.1 | ⎭ | 33 | $SiO_2$ | 86.0 | ⎭ |
| | | | | | Air | | |
| | | | | | Total | 5540 | |

* Diffusion Barriers

| # | Material | Thickness, nm | | | # | Material | Thickness, nm | |
|---|---|---|---|---|---|---|---|---|
| | Fused Silica | | | | 15 | Nb$_2$O$_5$ | 103.0 | |
| 1 | Nb$_2$O$_5$ | 13.4 | | | 16 | SiO$_2$ | 198.9 | |
| 2 | SiO$_2$ | 54.1 | | | 17 | Nb$_2$O$_5$ | 11.7 | Dielectric Layers |
| 3 | Nb$_2$O$_5$ | 21.2 | | | 18 | SiO$_2$ | 150.5 | |
| 4 | SiO$_2$ | 204.1 | | | 19 | Nb$_2$O$_5$ | 101.5 | |
| 5 | Nb$_2$O$_5$ | 114.0 | | | 20 | SiO$_2$ | 93.3 | |
| 6 | SiO$_2$ | 185.8 | | | 21 | Si$_3$N$_4$ * | 36.0 | |
| 7 | Nb$_2$O$_5$ | 115.4 | Dielectric Layers | | 22 | NiCrN | 0.5 | TCC Layers |
| 8 | SiO$_2$ | 165.1 | | | 23 | Ag | 20.0 | |
| 9 | Nb$_2$O$_5$ | 96.5 | | | 24 | NiCrN | 0.5 | |
| 10 | SiO$_2$ | 158.3 | | | 25 | Si$_3$N$_4$ * | 36.6 | |
| 11 | Nb$_2$O$_5$ | 77.2 | | | 26 | Al$_2$O$_3$ * | 83.1 | |
| 12 | SiO$_2$ | 27.7 | | | 27 | SnO$_2$:F | 449.2 | IRE Layers |
| 13 | Nb$_2$O$_5$ | 8.0 | | | 28 | Al$_2$O$_3$ * | 166.7 | |
| 14 | SiO$_2$ | 114.2 | | | 29 | SiO$_2$ | 84.8 | |
| | | | | | | Air | | |
| | | | | | | Total | 2891 | |

\* Diffusion Barriers

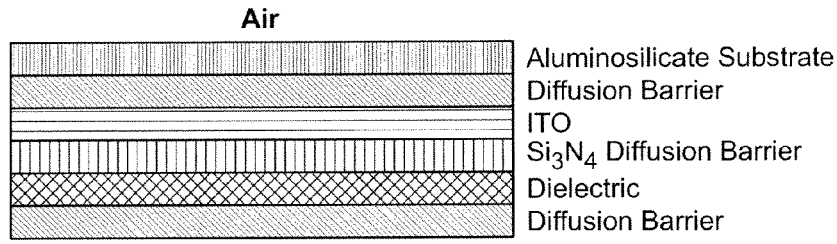

FIG. 6A

| # | Material | Thickness, nm |  | # | Material | Thickness, nm |  |
|---|---|---|---|---|---|---|---|
|  | Alumino-silicate |  |  | 24 | $Nb_2O_5$ | 19.4 | |
| 1 | $Si_3N_4$ * | 50.0 | TCC Layers | 25 | $SiO_2$ | 220.1 | |
| 2 | SWITO | 350.0 |  | 26 | $Nb_2O_5$ | 106.7 | |
| 3 | $Si_3N_4$ * | 50.0 |  | 27 | $SiO_2$ | 400.9 | |
| 4 | $Nb_2O_5$ | 87.5 |  | 28 | $Nb_2O_5$ | 120.2 | |
| 5 | $SiO_2$ | 10.4 |  | 29 | $SiO_2$ | 34.6 | |
| 6 | $Nb_2O_5$ | 23.7 |  | 30 | $Nb_2O_5$ | 24.5 | |
| 7 | $SiO_2$ | 181.7 |  | 31 | $SiO_2$ | 213.2 | |
| 8 | $Nb_2O_5$ | 112.1 |  | 32 | $Nb_2O_5$ | 108.1 | |
| 9 | $SiO_2$ | 196.3 |  | 33 | $SiO_2$ | 161.1 | |
| 10 | $Nb_2O_5$ | 22.1 |  | 34 | $Nb_2O_5$ | 81.9 | Dielectric Layers |
| 11 | $SiO_2$ | 25.9 |  | 35 | $SiO_2$ | 147.7 | |
| 12 | $Nb_2O_5$ | 128.0 |  | 36 | $Nb_2O_5$ | 92.4 | |
| 13 | $SiO_2$ | 181.9 | Dielectric Layers | 37 | $SiO_2$ | 162.9 | |
| 14 | $Nb_2O_5$ | 117.7 |  | 38 | $Nb_2O_5$ | 99.5 | |
| 15 | $SiO_2$ | 221.0 |  | 39 | $SiO_2$ * | 155.4 | |
| 16 | $Nb_2O_5$ | 15.1 |  | 40 | $Nb_2O_5$ | 30.9 | |
| 17 | $SiO_2$ | 36.5 |  | 41 | $SiO_2$ | 13.1 | |
| 18 | $Nb_2O_5$ | 107.9 |  | 42 | $Nb_2O_5$ | 32.1 | |
| 19 | $SiO_2$ | 21.8 |  | 43 | $SiO_2$ | 157.5 | |
| 20 | $Nb_2O_5$ | 14.6 |  | 44 | $Nb_2O_5$ | 90.3 | |
| 21 | $SiO_2$ | 369.1 |  | 45 | $SiO_2$ * | 61.5 | |
| 22 | $Nb_2O_5$ | 126.4 |  |  | Kr/XBr |  | |
| 23 | $SiO_2$ | 37.6 |  |  | Total | 5021 | |

* Diffusion Barriers

FIG. 6B

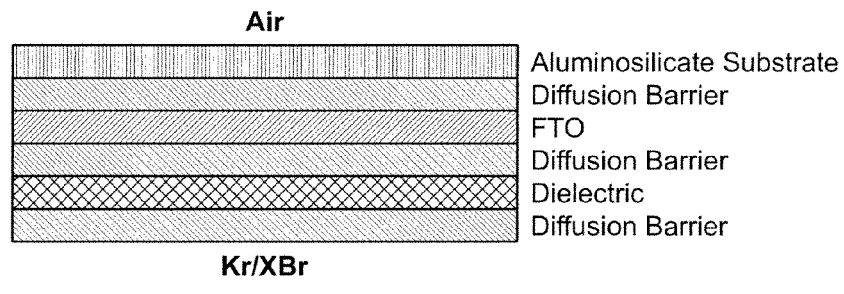

FIG. 7A

| # | Material | Thickness, nm |
|---|---|---|
|   | Alumino-silicate |   |
| 1 | Al$_2$O$_3$* | 50.0 |
| 2 | SWFTO | 400.0 |
| 3 | Al$_2$O$_3$* | 50.0 |
| 4 | Nb$_2$O$_5$ | 109.7 |
| 5 | SiO$_2$ | 186.3 |
| 6 | Nb$_2$O$_5$ | 118.3 |
| 7 | SiO$_2$ | 191.7 |
| 8 | Nb$_2$O$_5$ | 116.6 |
| 9 | SiO$_2$ | 186.1 |
| 10 | Nb$_2$O$_5$ | 117.1 |
| 11 | SiO$_2$ | 194.2 |
| 12 | Nb$_2$O$_5$ | 119.5 |
| 13 | SiO$_2$ | 191.4 |
| 14 | Nb$_2$O$_5$ | 216.6 |
| 15 | SiO$_2$ | 24.0 |
| 16 | Nb$_2$O$_5$ | 24.4 |
| 17 | SiO$_2$ | 206.1 |
| 18 | Nb$_2$O$_5$ | 18.4 |
| 19 | SiO$_2$ | 19.1 |
| 20 | Nb$_2$O$_5$ | 131.2 |

1–3: TCC Layers; 4–20: Dielectric Layers

| # | Material | Thickness, nm |
|---|---|---|
| 21 | SiO$_2$ | 21.9 |
| 22 | Nb$_2$O$_5$ | 19.0 |
| 23 | SiO$_2$ | 226.1 |
| 24 | Nb$_2$O$_5$ | 21.6 |
| 25 | SiO$_2$ | 28.5 |
| 26 | Nb$_2$O$_5$ | 129.6 |
| 27 | SiO$_2$ | 177.8 |
| 28 | Nb$_2$O$_5$ | 121.2 |
| 29 | SiO$_2$ | 22.4 |
| 30 | Nb$_2$O$_5$ | 113.1 |
| 31 | SiO$_2$ | 159.6 |
| 32 | Nb$_2$O$_5$ | 90.3 |
| 33 | SiO$_2$ | 147.1 |
| 34 | Nb$_2$O$_5$ | 98.2 |
| 35 | SiO$_2$ | 186.4 |
| 36 | Nb$_2$O$_5$ | 20.4 |
| 37 | SiO$_2$ | 183.5 |
| 38 | Nb$_2$O$_5$ | 95.8 |
| 39 | SiO$_2$* | 66.7 |
|   | Kr/XBr |   |
|   | Total | 4600 |

21–39: Dielectric Layers

* Diffusion Barriers

FIG. 7B

| # | Material | Thickness, nm | | # | Material | Thickness, nm | |
|---|---|---|---|---|---|---|---|
| | Boro-silicate | | | 17 | $Nb_2O_5$ | 26.0 | |
| 1 | $Si_3N_4$* | 35.0 | | 18 | $SiO_2$ | 159.0 | |
| 2 | NiCrN | 0.5 | TCC Layers | 19 | $Nb_2O_5$ | 12.8 | |
| 3 | Ag | 20.0 | | 20 | $SiO_2$ | 7.6 | |
| 4 | NiCrN | 0.5 | | 21 | $Nb_2O_5$ | 79.2 | |
| 5 | $Si_3N_4$* | 33.0 | | 22 | $SiO_2$ | 161.6 | |
| 6 | $SiO_2$ | 102.8 | | 23 | $Nb_2O_5$ | 112.2 | |
| 7 | $Nb_2O_5$ | 102.6 | | 24 | $SiO_2$ | 22.5 | Dielectric Layers |
| 8 | $SiO_2$ | 82.9 | | 25 | $Nb_2O_5$ | 36.3 | |
| 9 | $Nb_2O_5$ | 18.2 | | 26 | $SiO_2$ | 26.9 | |
| 10 | $SiO_2$ | 21.1 | | 27 | $Nb_2O_5$ | 28.4 | |
| 11 | $Nb_2O_5$ | 74.9 | Dielectric Layers | 28 | $SiO_2$ | 172.9 | |
| 12 | $SiO_2$ | 160.9 | | 29 | $Nb_2O_5$ | 95.4 | |
| 13 | $Nb_2O_5$ | 8.2 | | 30 | $SiO_2$ | 156.9 | |
| 14 | $SiO_2$ | 11.2 | | 31 | $Nb_2O_5$ | 93.3 | |
| 15 | $Nb_2O_5$ | 138.1 | | 32 | $SiO_2$* | 77.0 | |
| 16 | $SiO_2$ | 18.2 | | | Kr/XBr | | |
| | | | | | Total | 2096 | |

* Diffusion Barriers

INCANDESCENT LAMP INCORPORATING INFRARED-REFLECTIVE COATING SYSTEM, AND LIGHTING FIXTURE INCORPORATING SUCH A LAMP

CROSS-REFERENCE TO RELATED APPLICATIONS

Priority is claimed under 35 U.S.C. §119(e) to U.S. Provisional Application No. 60/820,321, filed by David W. Cunningham on Jul. 25, 2006, and entitled "Incandescent Lamp Incorporating IR-Reflective Coating"; No. 60/821,109, filed by David W. Cunningham on Aug. 1, 2006, and entitled "Incandescent Lamp Incorporating Infrared-Reflective Coating System"; and No. 60/888,468, filed by David W. Cunningham on Feb. 6, 2007, and entitled "Incandescent Lamp Incorporating Infrared-Reflective Coating System, and Lighting Fixture Incorporating Such a Lamp."

All of these applications are incorporated by reference herein.

BACKGROUND OF THE INVENTION

This invention relates generally to incandescent lamps and, more particularly, to incandescent lamps having envelopes that carry infrared (IR)-reflective coatings. The invention also relates to lighting fixtures incorporating such lamps.

Incandescent lamps of this kind, having envelopes that carry IR-reflective coatings, typically in the form of multi-layer stacks of dielectric materials, are well known in the lighting industry. Such dielectric coatings include alternating layers of high-refractive index materials, e.g., niohia ($Nb_2O_5$), tantala ($Ta_2O_5$), and titania ($TiO_2$), and low-refractive index materials, e.g., silica ($SiO_2$), wherein the layer thicknesses are controlled to be substantially one quarter the wavelength of the light to be reflected by constructive interference. The successive layers of such coatings are typically created using physical vapor deposition (PVD), reactive sputtering, chemical vapor deposition (CVD), or plasma-impulse chemical vapor deposition (PICVD) to deposit various oxides onto a substrate, such as glass.

Multi-layer dielectric coatings can be designed to be highly reflective in a range of wavelengths and highly transmissive in other wavelengths. For example, a dielectric coating that reflects IR light, usually in the range of 750 to 1600 nanometers (nm), but that transmits other wavelengths of light, is commonly called a "hot mirror" or an "IR coating." The transition from reflecting wavelengths to transmitting wavelengths can be made very narrow, typically about 50 nm or less.

IR coatings were first combined with quartz-halogen lamps in the late-1980s, to increase an incandescent lamp's luminous efficacy. Incandescent light sources typically produce about 10-15% visible light and about 85-90% IR light. An IR coating on an incandescent lamp's transparent envelope reflects a substantial portion of the IR light emitted by the lamp filament back onto the filament. The filament absorbs a portion of that IR light, thereby reducing the amount of electrical power required to heat the filament to a given temperature and consequently increasing the lamp's luminous efficacy. Lamps incorporating linear filaments have exhibited improved luminous efficacy as high as 40%. For example, an FCM linear lamp has a luminous efficacy of 28 LPW, while an IR-coated FCM/HIR linear lamp of equal luminous flux has a luminous efficacy of 39 LPW.

IR-coated quartz halogen lamps generally are available in two form factors: "linear lamps" and "elliptical lamps." Linear lamps generally include a long, single-coiled filament and a concentric tubular envelope. Most of the IR light reflected by the coating is redirected back to the filament, because the filament is a cylindrical object concentric with the cylindrical IR-coated envelope. Elliptical lamps generally include a short, coiled-coil filament and an elliptical envelope. The IR-coated elliptical reflector is configured with its two foci located approximately at the ends of the filament. For this reason, most of the IR light reflected by the coating is redirected back to the filament, and large end losses associated with short filaments are avoided.

Transparent conductive coatings (TCCs), formed of materials such as indium tin oxide (ITO), have been widely used in products where it is desirable to make a non-conducting substrate, such as glass, electrically conductive yet highly transmissive to visible light. By appropriately varying the doping and thickness of the TCC and by controlling the deposition process, a coating can be made to have a visible light transmissivity greater than 85% and to be electrically conductive (e.g., about 20 $\Omega$/square). Such a coating also has the property of having a reflectivity to IR light that increases gradually at longer wavelengths. In one example, a typical 200-nm thick ITO coating is about 8% reflective at 1000 nm, 45% reflective at 2000 mm, and 72% reflective at 3000 nm. The wavelength at which transmittance and reflectance of this coating are equal, also known as the "plasma frequency," is approximately 1850 nm.

IR coatings used in the past with quartz-halogen lamps generally transmit on the order of 5 to 30% of IR light in a wavelength range of 740 to 1600 nm; 20 to 90% of IR light in a wavelength range of 1600 to 2200 nm; and greater than 75% of IR light at wavelengths above 2200 nm. Because dielectric coatings have very little absorption at these wavelengths, it follows that such prior art IR coatings reflect 70 to 95% of IR light in the range of 750 to 1600 nm; 10 to 80% of IR light in the range of 1600 to 2200 nm; and less than 25% of IR light above 2200 n. Peak IR emittance from a typical tungsten filament operating at 3000° K (color temperature) is known to occur at about 920 nm, and more than half of the IR power from such a filament is located in a wavelength range of 750 to 1600 nm. Consequently, prior art coating designs generally have been thought to be highly effective at redirecting most of the IR light back to the lamp filament.

Another prior art IR coating design, which is disclosed in U.S. Pat. No. 6,476,556 to E. Cottaar, includes an interference film having a transmittance that averages at least 90% in the visible wavelength range of 400 to 760 nm and having a reflectance that averages at least 75% in the infrared wavelength range of 800 to 2200 nm. Preferably, the interference film has a reflectance that averages at least 85% in the infrared wavelength range of 800 to 2500 nm.

In general, prior art IR coatings for quartz halogen lamps are designed to reflect the maximum integrated IR power generated by the light source. In other words, the coatings have been designed to maximize the integrated sum of reflection at each wavelength above 700 nm multiplied by the radiated power of the filament at the same wavelength. Designers of such prior art IR coatings also have sought to maintain maximum visible transmission, generally at values greater than about 90%.

The IR coating designs described briefly above have proven to be effective in improving the luminous efficacies of incandescent lamps. However, there remains a continuing need for an improved lamp, and for a lighting fixture incorporating such a lamp, exhibiting yet a higher luminous efficacy. The present invention fulfills this need and provides further related advantages.

SUMMARY OF THE INVENTION

The present invention is embodied in an incandescent lamp, and related lighting fixture incorporating such a lamp, wherein the lamp includes a special coating system configured to provide an improved luminous efficacy. The coating system is deposited on an envelope that encloses a filament, on either or both of an inner surface facing the filament or an outer surface facing away from the filament. In one form of the invention, the coating system includes (1) a dielectric coating configured to transmit a substantial portion of visible light emitted by the filament and to reflect a substantial portion of infrared light emitted by the filament; and (2) a transparent conductive coating located on the side of the dielectric coating opposite the filament and configured to transmit a substantial portion of visible light emitted by the filament and transmitted through the dielectric coating, and further configured to reflect a substantial portion of infrared light emitted by the filament and transmitted through the dielectric coating.

In one preferred form of the invention, the dielectric coating and the transparent conductive coating both are located on the inner surface of the envelope. In addition, the coating system further includes a first diffusion barrier located adjacent to the dielectric coating, on the side of the dielectric coating nearest the filament. This first diffusion barrier can be configured to substantially reduce the diffusion of a halogen gas and halogen-containing compounds located within the envelope, wherein the halogen is selected from the group consisting of bromine, iodine, and fluorine. The coating system can further include a second diffusion barrier located between the dielectric coating and the transparent conductive coating, and a third diffusion barrier located between the transparent conductive coating and the envelope. The second and third diffusion barriers both can be configured to substantially reduce the diffusion of a gas such as oxygen and/or a dopant such as, tin, or aluminum fluorine. The first, second, and third diffusion barriers can comprise a material selected from the group consisting of silicon nitride, aluminum oxide, and silicon dioxide. In this form of the invention, the lamp's envelope can comprise a material selected from the group consisting of fused silica, alumino-silicate, and borosilicate glass.

In an alternative form of the invention, the dielectric coating and the transparent conductive coating both are located on the outer surface of the envelope. In this form of the invention, the coating system further includes an infrared-emissive coating located on the side of the transparent conductive coating opposite the dielectric coating. This infrared-emissive coating has a weighted average emissivity greater than 0.3 in the wavelength range corresponding substantially to the spectral power distribution of a black body at the temperature of the envelope, and is configured to transmit a substantial portion of visible light transmitted through the transparent conductive coating. In addition, the coating system can further include a first diffusion barrier located between the dielectric coating and the transparent conductive coating; a second diffusion barrier located between the transparent conductive coating and the infrared-emissive coating; and a third diffusion barrier located adjacent to the infrared-emissive coating, on the side of the infrared-emissive coating opposite the transparent conductive coating. These three diffusion barriers all can comprise a material selected from the group consisting of silicon nitride, aluminum oxide, and silicon dioxide. The infrared-emissive coating can comprise a material selected from the group consisting of fluorine-doped tin oxide, fluorine-doped zinc oxide, tin-doped indium oxide, aluminum-doped zinc oxide, and mixtures thereof.

In another form of the invention, the dielectric coating is deposited on the inner surface of the envelope and the transparent conductive coating is deposited on the outer surface of the envelope. The dielectric coating can be deposited using a plasma-impulse chemical vapor deposition or atomic layer deposition process. The coating system also preferably includes appropriate diffusion layers and an infrared-emissive coating, as discussed above.

In yet another form of the invention, the dielectric coating includes an inner dielectric coating located on the inner surface of the envelope and an outer dielectric coating located on the outer surface of the envelope. In this form of the invention, the inner and outer dielectric coatings each include a plurality of dielectric layers having prescribed refractive indices and prescribed thicknesses. In addition, the plurality of layers of the inner dielectric coating and the plurality of layers of the outer dielectric coating optionally can be made to be identical to each other, relative to the envelope. Such inner and outer dielectric layers can be deposited simultaneously using an atomic layer deposition process. The coating system also preferably includes appropriate diffusion layers and an infrared-emissive coating, as discussed above.

In all of the above-described forms of the invention, the transparent conductive coating can comprise a material selected from the group consisting of indium-doped tin oxide, aluminum-doped zinc oxide, titanium-doped indium oxide, fluorine-doped tin oxide, fluorine-doped zinc oxide, cadmium stannate, gold, silver, and mixtures thereof. Also in all of the above-described forms of the invention, the dielectric coating can comprise a plurality of dielectric layers having prescribed refractive indices and prescribed thicknesses. Ordinarily, these layers comprise alternating layers of a first material having a relatively low refractive index and of a second material having a relatively high refractive index.

In another feature of the invention, optionally applicable to all of the forms of the invention described above, the lamp's envelope has a coefficient of thermal expansion that is equal to or greater than that of the second material. The second material can be selected from the group consisting of niobia, titania, tantala, and mixtures thereof and the envelope can comprise a material selected from the group consisting of alumino-silicate and borosilicate glass. Preferably, the second material of the dielectric coating is deposited at a temperature intermediate 25° C. and the temperature of envelope when the lamp is operated at full power. This deposition temperature can be in the range of 350 to 450° C.

In yet another form of the invention, the coating system includes a dielectric coating and an optional transparent conductive coating, with the dielectric coating comprising a plurality of alternating layers of a first material having a relatively low refractive index and of a second material having a relatively high refractive index, and with the envelope's coefficient of thermal expansion being equal to or greater than that of the second material. This second material can be selected from the group consisting of niobia, titania, tantala, and mixtures thereof, and the envelope can comprise a material selected from the group consisting of alumino-silicate and borosilicate glass. In addition, the second material preferably is deposited at a temperature intermediate 25° C. and the temperature of the envelope when the lamp is operated at full power. Preferably, this deposit temperature is in the range of 350 to 450° C. If the coating system further includes a transparent conductive coating, such coating is located on the side of the dielectric coating opposite the filament. The coating system also preferably includes appropriate diffusion layers and an infrared-emissive coating, as discussed above.

In yet another form of the invention, the coating system again includes a dielectric coating and an optional transparent conductive coating, with the dielectric coating including an inner dielectric coating deposited on the inner surface of the envelope and an outer dielectric coating deposited on the outer surface of the envelope. The inner and outer dielectric coatings each include a plurality of dielectric layers having prescribed refractive indices and prescribed thicknesses, and, in one form can be made to be identical to each other, relative to the envelope. If the coating system further includes a transparent conductive coating, such coating is deposited on the outer surface of the envelope, on the side of the outer dielectric coating opposite the filament. The coating system also preferably includes appropriate diffusion layers and an infrared-emissive coating, as discussed above.

Other features and advantages should become apparent from the following description of the preferred embodiments, taken in conjunction with the accompanying drawings, which illustrate, by way of example, the principles of the invention.

BRIEF DESCRIPTION OF THE DRAWINGS

FIG. 3A is a schematic cross-sectional view (not to scale) of a first embodiment of a coating system in accordance with the invention, including a dielectric coating, a transparent conductive coating in the form of indium-doped tin oxide, and an infrared-emissive coating, all deposited on the outer surface of a lamp envelope formed of fused silica.

FIG. 3B is a table setting forth the specific materials and thicknesses for the individual layers of the coating system of FIG. 3A.

FIGS. 6A-6C are similar to FIGS. 3A-3C, but of a coating system that includes a dielectric coating and a transparent conductive coating in the form of indium-doped tin oxide, both deposited onto the inner surface of a lamp envelope formed of alumino-silicate glass.

FIGS. 7A-7C are similar to FIGS. 6A-6C, but of a coating system that includes a transparent conductive coating incorporating fluorine-doped tin oxide instead of indium-doped tin oxide.

DESCRIPTION OF THE PREFERRED EMBODIMENTS

Figure 1:
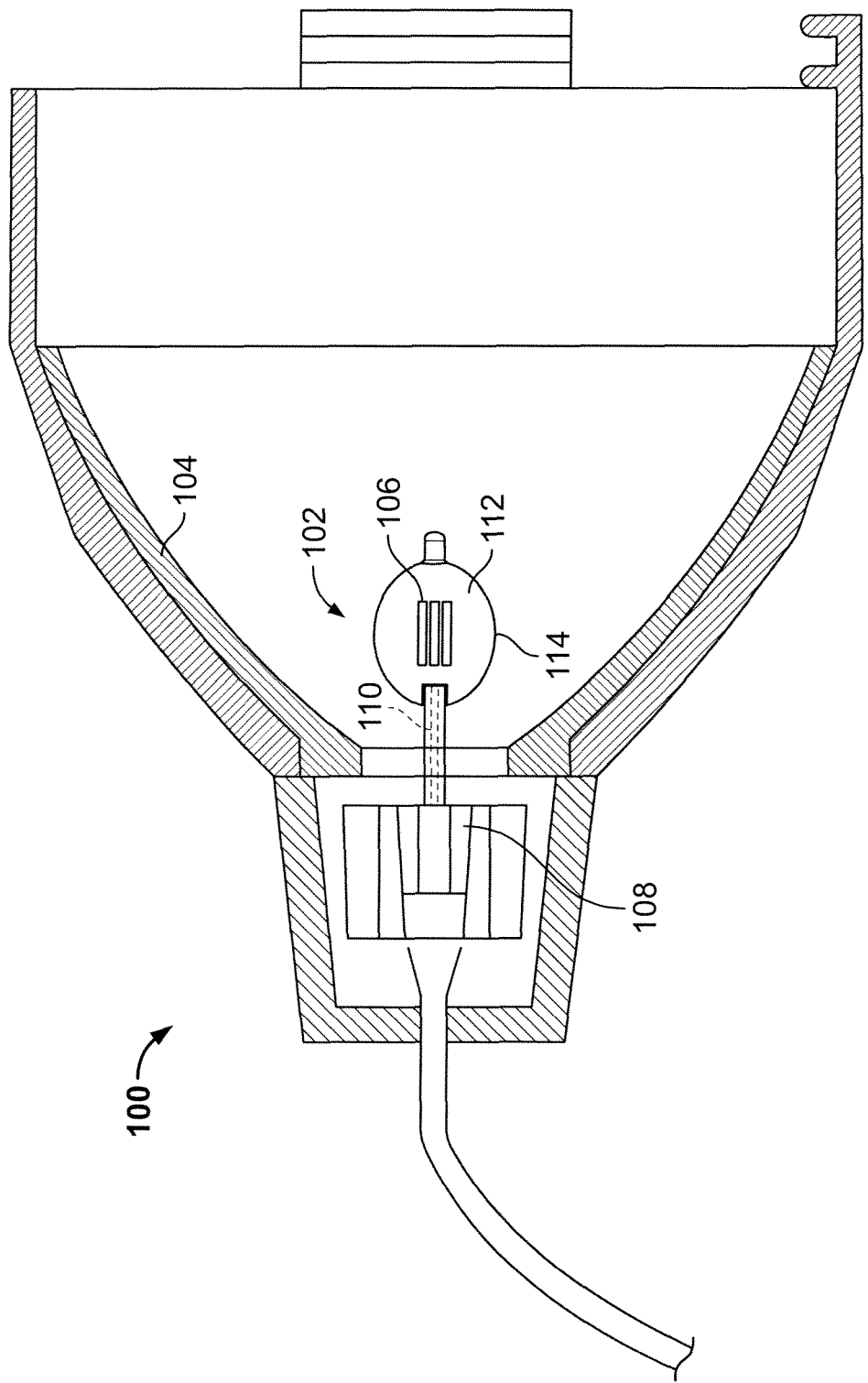
FIG. 1 is a side sectional view of a lighting fixture incorporating an incandescent lamp in accordance with the invention, like the lamp depicted in FIGS. 2A, 2B, and 2C.

With reference now to the illustrative drawings, and particularly to FIGS. 1 and 2A, 2B, and 2C, there is shown a lighting fixture 100 and incandescent lamp 102 embodying the present invention. The incandescent lamp is mounted to a concave reflector 104, with the lamp's filaments 106 located substantially at a focal point of the reflector. Light emitted by the lamp is reflected by the reflector to project a beam of light. In addition to the filaments, the lamp includes a base 108, a pair of leads 110 forming an electrical connector, and a transparent envelope 112 enclosing the filaments. A special optical coating system 114 is deposited onto the inner surface, the outer surface, or both surfaces of the lamp's envelope, such coating system being configured to reflect back toward the filaments a substantial amount of incident infrared (IR) light, but to transmit a substantial amount of incident visible light.

Figure 2A:
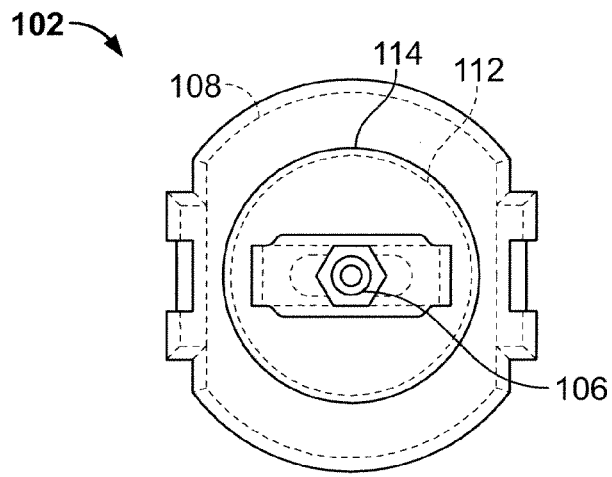
FIGS. 2A-2C are three views depicting an incandescent lamp in accordance with the invention, incorporating an IR coating on the lamp's transparent envelope.
Figure 2B:
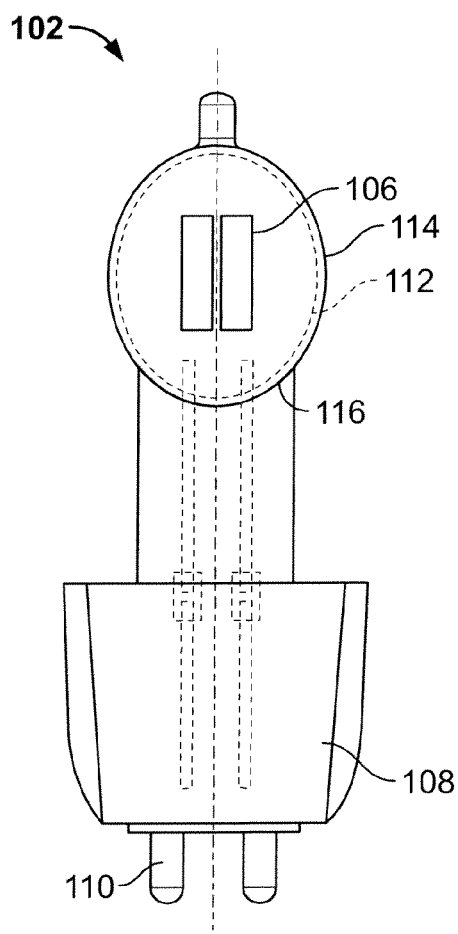
Figure 2C:
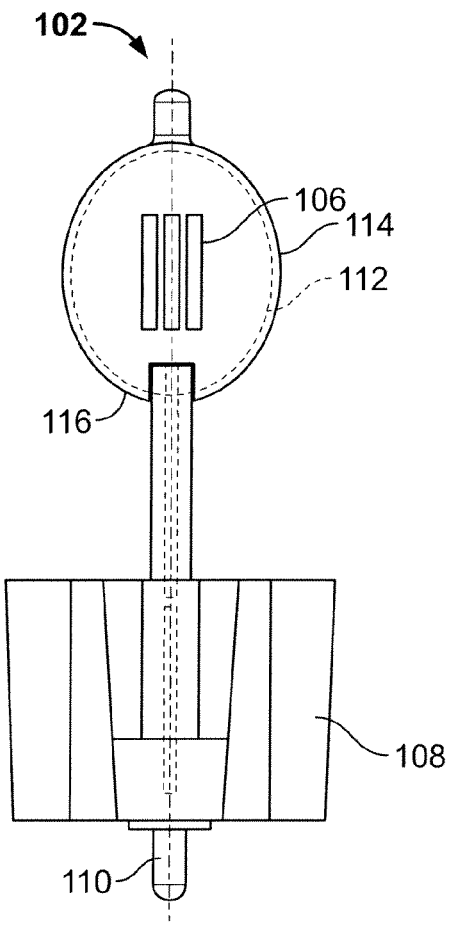

With particular reference to FIGS. 2A, 2B, and 2C, the lamp 102 includes a plurality of filaments 106, each having the form of a helical coil. The filaments are arranged with their longitudinal axes in parallel. Other filament configurations may include a single helical coil or a coiled-coil. A broadband reflective coating 116 may optionally be disposed on a lower portion of the lamp envelope 112, in the vicinity of the base. This reflective coating 116 reflects back toward the filaments both visible and infrared light that otherwise would have been incident on the lamp base, and thus wasted, thereby improving the lamp's luminous efficacy.

The optical coating system 114 that forms a part of the incandescent lamp 102 and lighting fixture 100 of the invention are specific implementations of coating systems disclosed in co-pending U.S. patent application Ser. No. 11/388, 770, filed by David W. Cunningham on Mar. 24, 2006, and entitled "Incandescent Lamp Incorporating Extended High-Reflectivity IR Coating and Lighting Fixture Incorporating Such an Incandescent Lamp." That application is incorporated by reference herein.

One optical coating system disclosed in the prior non-provisional application includes a combination of two distinct coatings: (1) a dielectric coating including a plurality of dielectric layers having prescribed thicknesses and refractive indices (e.g., alternating high and low indices); and (2) a transparent conductive coating (TCC) including a transparent electrically conductive material having a prescribed thickness and optical characteristics. The dielectric coating and TCC are configured such that each provides a prescribed transmittance/reflectance spectrum and such that the two coatings cooperate with each other and with the lamp's filament to provide the lamp with a higher luminous efficacy than that of a corresponding lamp lacking such a coating system.

In the prior non-provisional application, the dielectric coating and TCC were specified as being located in various positions on the lamp's transparent envelope, or on a separate transparent envelope surrounding the lamp. The two coatings were specified as preferably being located contiguous with each other. Suitable materials for the dielectric coating include silica ($SiO_2$), alumina ($Al_2O_3$), and mixtures thereof for the low-index of refraction material, and niobia ($NbO_2$), titania ($TiO_2$), tantala ($Ta_2O_5$), and mixtures thereof, for the high-index material. Suitable electrically conductive materials for the TCC include indium-doped tin oxide (ITO), aluminum-doped zinc oxide (AZO), titanium-doped indium oxide (TIO), fluorine-doped tin oxide (FTO), fluorine-doped zinc oxide (FZO), cadmium stannate, silver, gold, and mixtures thereof.

The TCC can take one of three forms: (1) a p-doped transparent conductive coating, such as indium tin oxide (ITO); (2) an n-doped transparent conductive coating, such as fluorine-doped tin oxide (FTO); and (3) a thin-film metallic coating, such as silver (Ag). Examples of coating systems incorporating the first form of TCC in combination with a dielectric coating are depicted in FIGS. 3 and 6; examples of coating systems incorporating the second form of TCC in combination with a dielectric coating are depicted in FIGS. 4 and 7; and examples of coating systems incorporating the third form of TCC in combination with a dielectric coating are depicted in FIGS. 5 and 8.

FIGS. 3-5 depict these three alternative coating systems deposited onto the lamp envelope's outer surface, and FIGS. 6-8 depict these three alternative coating systems deposited onto the envelope's inner surface. Prior art lamps incorporating infrared-reflective coatings generally have deposited such coatings only on the envelope's outer surface. This is because of difficulties in depositing coatings on the envelope's inner surface, and also because placing the coating on the inner surface can lead to undesired interactions between the coating and the halogen gas normally located within the envelope.

Difficulties can arise when a TCC is combined with a contiguous dielectric coating on a lamp envelope. In particular, defects such as cracks and crazes can arise in the dielectric coating, which can lead to discontinuities in the TCC and adversely affect the TCC's performance. These defects are believed to be caused by mechanical stresses to the coating, which generally can be classified as intrinsic stresses and extrinsic stresses.

Intrinsic stresses are believed to be characteristic to the deposition process conditions, internal physical properties of the coating material, post-deposition annealing, and the total film thickness. Intrinsic stresses can be minimized by using deposition processes that are optimized to deliver specific stochiometry, optimal packing density, and low levels of impurities.

Extrinsic stresses are believed to be created by a mismatch in the rates of thermal expansion for the coating layers and for the lamp envelope. If the envelope's temperature when the lamp is "off" or "full on" is substantially different from what the envelope's temperature had been during the deposition process, then significant stresses can arise between the coating and the envelope. For example, if dielectric coating materials having a high coefficient of thermal expansion (CTE), such as titania ($TiO_2$) or tantala ($Ta_2O_5$), are deposited onto a lamp envelope material having a low CTE, such as fused silica, at a temperature significantly higher than the envelope's temperature when the lamp is in its "off" state, then the coating will undergo a significant tensile stress when the lamp later is in its "off" state. On the other hand, if such coating materials are deposited onto the lamp envelope at a temperature significantly lower than the envelope's temperature when the lamp is in its "full on" state, then the coating will undergo a significant compressive stress when the lamp later is in its "full on" state.

Conversely, for dielectric coating materials having a CTE that is comparatively lower than that of the lamp envelope, if the materials are deposited onto the envelope at a temperature significantly higher than the envelope's temperature when the lamp is in its "off" state, then the coating will undergo a significant compressive stress when the lamp later is in its "off" state. On the other hand, if such materials are deposited onto the envelope at a temperature significantly lower than the envelope's temperature when the lamp later is in its "full on" state, then the coating will undergo a significant tensile stress when the lamp is in its "full on" state.

Intrinsic and extrinsic stresses both contribute to the final tensile or compressive state of the deposited coatings. Coatings generally can handle compressive stress significantly better than they can handle tensile stress. Tensile stress is particularly detrimental to the coating's integrity and can cause the coating to crack, craze, and/or peel from the substrate. If the TCC is located adjacent to, and overlaying, the dielectric coating, such cracking, crazing, and peeling can lead to discontinuities in the TCC, which can adversely affect the TCC's performance.

Figure 12:
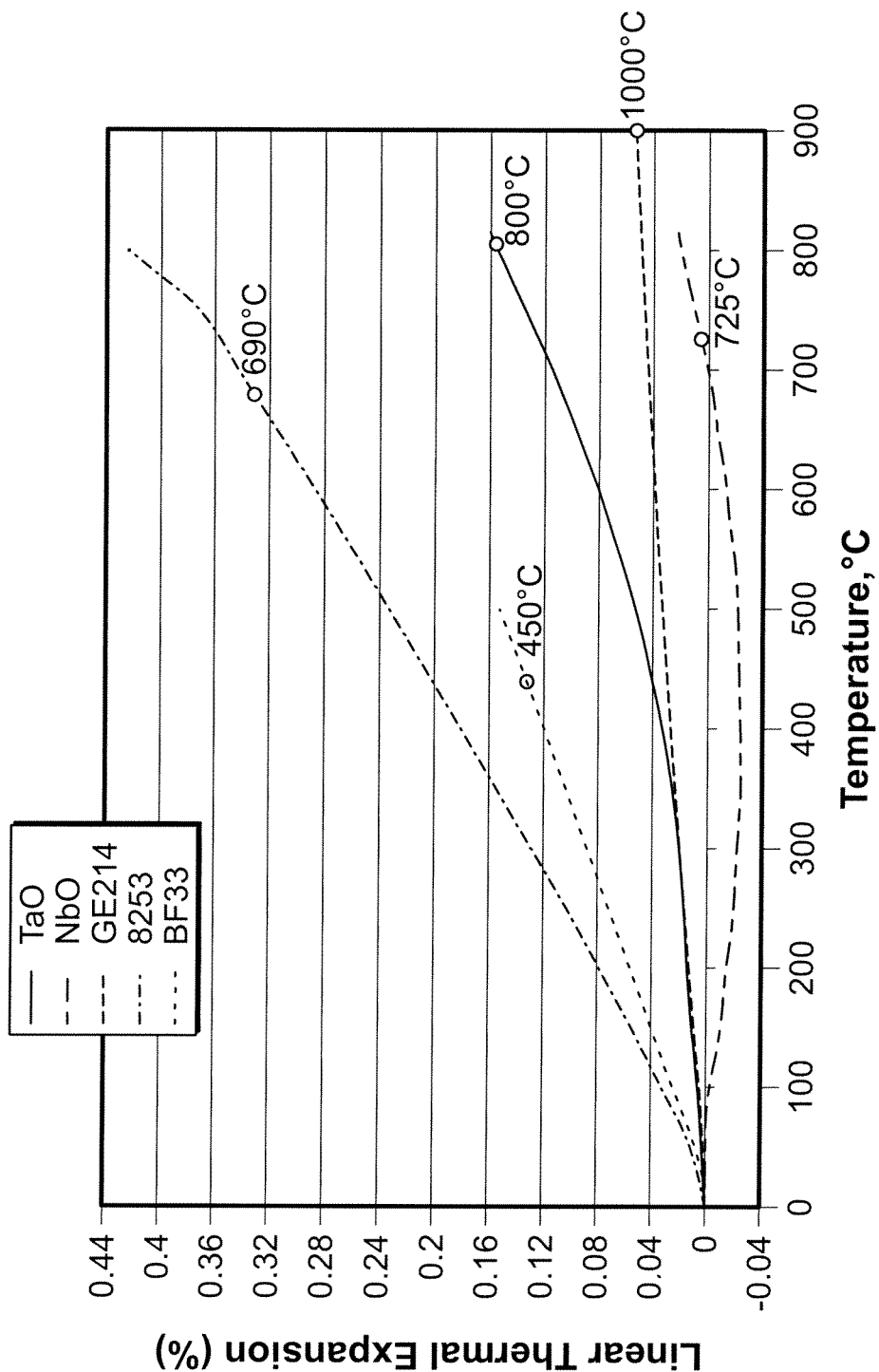
FIG. 12 is a graph depicting the linear thermal expansion coefficients for various materials, including tantala, niobia, and several alternative transparent glasses, over a temperature range of 0 to 900° C.

Extrinsic stress in the dielectric coating can be reduced by selecting dielectric materials having CTEs similar to, or slightly lower than, that of the lamp envelope. A high-index dielectric material such as niobia ($Nb_2O_5$), when deposited onto a fused silica envelope at a moderate temperature in the range of 200 to 300° C., can be operated at temperatures as high as 700 to 800° C. without cracking. This is because niobia has a CTE that is slightly lower than that of fused silica, as shown in FIG. 12. Silica ($SiO_2$), which is suitable for use as the low-index material in most multilayer dielectric coating designs, has a relatively low CTE and also is easily deformable because of its amorphous and flexible internal bond structure. Consequently, the extrinsic stress in a multilayer optical design largely is determined by the choice of the high-index dielectric material.

In one feature of the invention, the lamp envelope 112 is formed of a material having a CTE that is equal to, or slightly greater than, that of the high-index material used in the dielectric coating. This can prevent cracking of the dielectric coating and, consequently, can provide a successful combination of the dielectric coating with a TCC. For example, tantala can be used without cracking if the lamp envelope is formed of a borosilicate or aluminosilicate glass. This is because these glasses have a higher CTE than that of tantala, as shown in FIG. 12. Consequently, a dielectric coating containing tantala can be used in combination with a TCC such as ITO on an envelope formed of aluminosilicate, whereas the same coating combination could not be used effectively on an envelope formed of fused silica.

Diffusion Barriers

In addition to being adversely affected by temperature-induced cracking in the adjacent dielectric coating, p-doped TCCs can also be adversely affected by the presence of oxygen at elevated temperatures. Oxygen is present in the atmosphere and can also be released from some of the oxides in the dielectric coating itself. In one feature of the invention, an oxygen diffusion barrier, such as silicon nitride ($Si_3N_4$), is deposited above and below a p-doped TCC such as ITO. Such a barrier is believed to block oxygen diffusion into the TCC at elevated temperatures and prevent a subsequent loss of carrier density and IR reflectivity. Such diffusion barriers are incorporated into the coating systems depicted in FIGS. 3 and 6.

Figure 13:
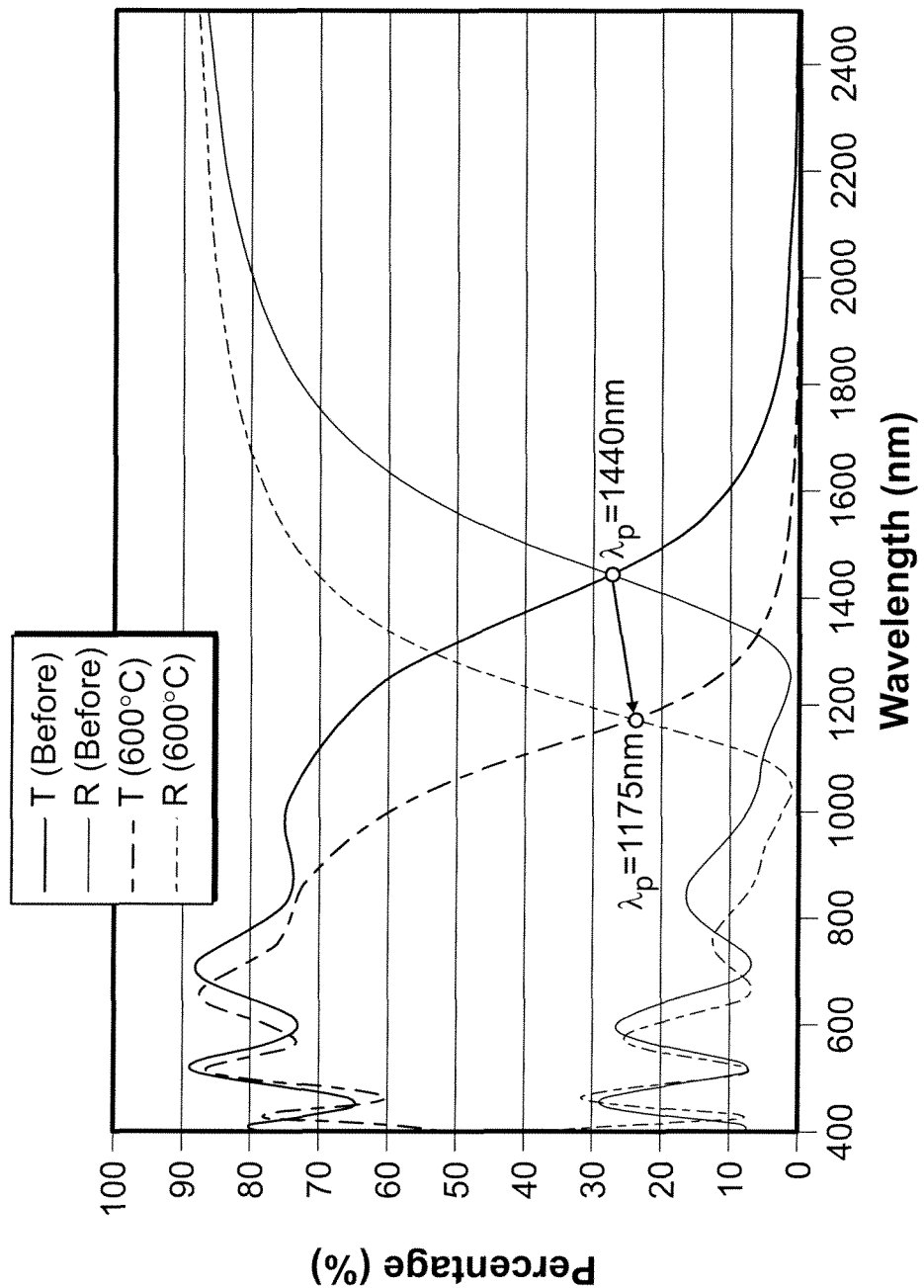
FIG. 13 is a graph depicting the transmission and reflection of indium-doped tin oxide both before and after operation at 600° C., over a wavelength range spanning from 400 to 2500 nm.

The presence of an oxygen diffusion barrier to prevent oxidation of the TCC, in combination with operating the TCC at elevated temperatures, also is believed to provide the benefit of promoting grain growth in the TCC. This can reduce the number of surface trapped states, which in turn can increase the TCC's carrier concentration, plasma frequency, and IR reflectivity. This effect is depicted in FIG. 13 for ITO, which shows a reduction in plasma wavelength from 1440 nm to 1175 nm.

N-doped TCCs, such as fluorine-doped tin oxide (FTO) and fluorine-doped zinc oxide (FZO), are inherently more stable in an oxygen atmosphere at high temperatures than are p-doped TCCs. This is because n-doped TCCs do not depend on oxygen vacancies for their high conductivity and IR reflectivity. Nevertheless, fluorine-doped TCCs still preferably include a diffusion barrier, such as silica ($SiO_2$), alumina ($Al_2O_3$), or silicon nitride ($Si_3N_4$), to prevent the fluorine from diffusing out of the TCC. Such diffusion barriers are depicted in FIGS. 4 and 7.

If the diffusion barrier associated with an n-doped TCC is a low-index material, such as $SiO_2$ or $Al_2O_3$, it also acts as an index-matching layer. Such diffusion barriers are depicted in FIGS. 4 and 7. On the other hand, if the diffusion barrier is a high-index material, such as $Si_3N_4$, an index-matching layer of $SiO_2$ preferably is added to the coating.

Fluorine doping, which substitutes fluorine for oxygen, also yields superior optical performance as compared with metallic dopants, in materials such as tin oxide and zinc oxide. A theoretical understanding of this performance advantage is provided by considering that the conduction band of oxide semiconductors is derived mainly from metal orbitals. If a metal dopant is used, it is electrically active when it substitutes for the primary metal. The conduction band thus receives a strong perturbation from each metal dopant, the scattering of conduction electrons is enhanced, and the mobility and conductivity are decreased. In contrast, when fluorine substitutes for oxygen, the electronic perturbation is largely confined to the filled valence band, and the scattering of conduction electrons is minimized.

Oxygen diffusion barriers also can be used in connection with TCCs having the form of thin metallic layers of silver. Such diffusion barriers can prevent oxidation of the silver and subsequent loss of IR reflectivity at elevated temperatures. The coating systems depicted in FIGS. 5 and 8 incorporate such oxygen diffusion barriers. The diffusion barriers preferably are deposited using a technique that yields coatings that are very dense, free of pinholes, and contain no trapped oxygen. Exemplary techniques include sputtering, high-temperature chemical vapor deposition (CVD), and plasma-enhanced CVD (PECVD).

When oxygen diffusion barriers are used in combination with TCCs having the form of thin metallic layers of silver, an adhesion layer preferably is interposed between silver layer and the diffusion barrier. Such adhesion layers are shown in FIGS. 5 and 8. Such adhesion layers can prevent the silver from agglomerating at elevated temperatures. Suitable materials for the adhesion layers include, for example, nichrome ($NiCr_x$), and more preferably, nichrome nitride ($NiCrN_x$).

Halogen Diffusion Barriers

Halogen lamps incorporating a dielectric/TCC coating system on the inner surfaces of their envelopes are vulnerable to an undesired reaction between the TCC, materials in the dielectric coating, and the halogen gas present within the envelope, typically hydrogen bromide (HBr) or methyl bromide ($CH_3Br$). Such a reaction could degrade the lamp's performance. To prevent such a reaction from occurring, the coating system preferably further includes a halogen diffusion barrier (see FIGS. 6-8). This halogen diffusion barrier is similar to the oxygen diffusion barrier provided on lamps incorporating a dielectric/TCC coating on the outer surfaces of their envelopes (see FIGS. 3-5).

The halogen diffusion barrier can take the form of a layer of silica ($SiO_2$), alumina ($Al_2O_3$), silicon nitride ($Si_3N_4$), or other suitable material. If this diffusion barrier is a low-index material (such as $SiO_2$ or $Al_2O_3$), the barrier also acts as an index-matching layer. The embodiments depicted in FIGS. 6-8 include halogen diffusion barrier in the form of $SiO_2$. On the other hand, if the halogen diffusion barrier is a high-index material (such as $Si_3N_4$), an index-matching layer of preferably $SiO_2$ is added to the coating. If the lamp contains only an inert gas or vacuum, no halogen diffusion barrier is required.

If the coating system is deposited onto the inner surface of a lamp envelope formed of a low melting point alkali glass such as borosilicate, then the coating system preferably further includes an undercoat that functions as a sodium barrier. This sodium barrier can take the form of a layer of silica ($SiO_2$), alumina ($Al_2O_3$), silicon nitride ($Si_3N_4$), or other suitable material. The embodiments depicted in FIGS. 6-8 include sodium barriers in the form of $Si_3N_4$.

Heat Dissipation

Dielectric/TCC coating systems preferably are operated at relatively low temperatures, to prevent degradation of the coatings and the resulting loss of IR reflectivity, even with the addition of oxygen diffusion barriers. In particular, coating systems incorporating TCCs in the form of p-doped and n-doped transparent conductive coatings preferably are operated at temperatures in the range of 600 to 700° C., and coating systems incorporating TCCs in the form of metallic coatings preferably are operated at temperatures in the range of 400 to 500° C.

The envelope temperatures of conventional quartz halogen lamps typically are in the range of 700 to 900° C. For this reason, the preferred lower operating temperatures of the coating systems of the invention ordinarily should be expected to require a substantial increase in the lamp envelope's surface area and size, as compared to conventional quartz halogen lamps. However, such an increase could lead to a loss of IR collection efficiency. A further complication is that a substantial portion of the IR radiation that is not reflected by TCCs is absorbed, not transmitted. Highly IR-reflective coatings, such as TCCs, also lower the average emissivity of the lamp's envelope, thereby reducing their emission via radiation. This increased absorption and lower average emissivity both will increase the lamp envelope's temperature.

It, therefore, will be appreciated that it is desirable to reduce the temperature of the coating system, without unreasonably increasing the size of the lamp envelope. This can be accomplished by increasing the lamp envelope's emissivity and/or its convection coefficient. Alternatively, it can be accomplished by decreasing the power to be dissipated.

The lamp envelope is cooled both by convection and by radiation. The total power removed from the lamp envelope is represented by the following formula, at thermal equilibrium:

$$Q=Ah(T-T_A)+A\sigma\epsilon(T^4-T_A^4)$$

Where: Q is the power dissipated (watts)
A is the envelope's outer surface area ($m^2$)
h is the envelope's convection coefficient (W/($m^{2 \cdot \circ}$ K))
T is the envelope temperature ($^\circ$ K)
$T_A$ is the ambient temperature ($^\circ$ K)
$\sigma$ is the Stefan-Boltzmann constant (W/($m^{2 \cdot \circ}$ $K^4$))
$\epsilon$ is the envelope's emissivity (no units)

The radiation flux incident on different areas of the lamp envelope ordinarily is variable. This leads to variations in the thermal load and temperature for different areas of the envelope. In addition, the thermal conductivity of the envelope material inherently creates a thermal differential between the envelope's inner and outer surfaces, and it will contribute, to at least a limited degree, to equalizing the envelope's temperature profile.

Figure 14:
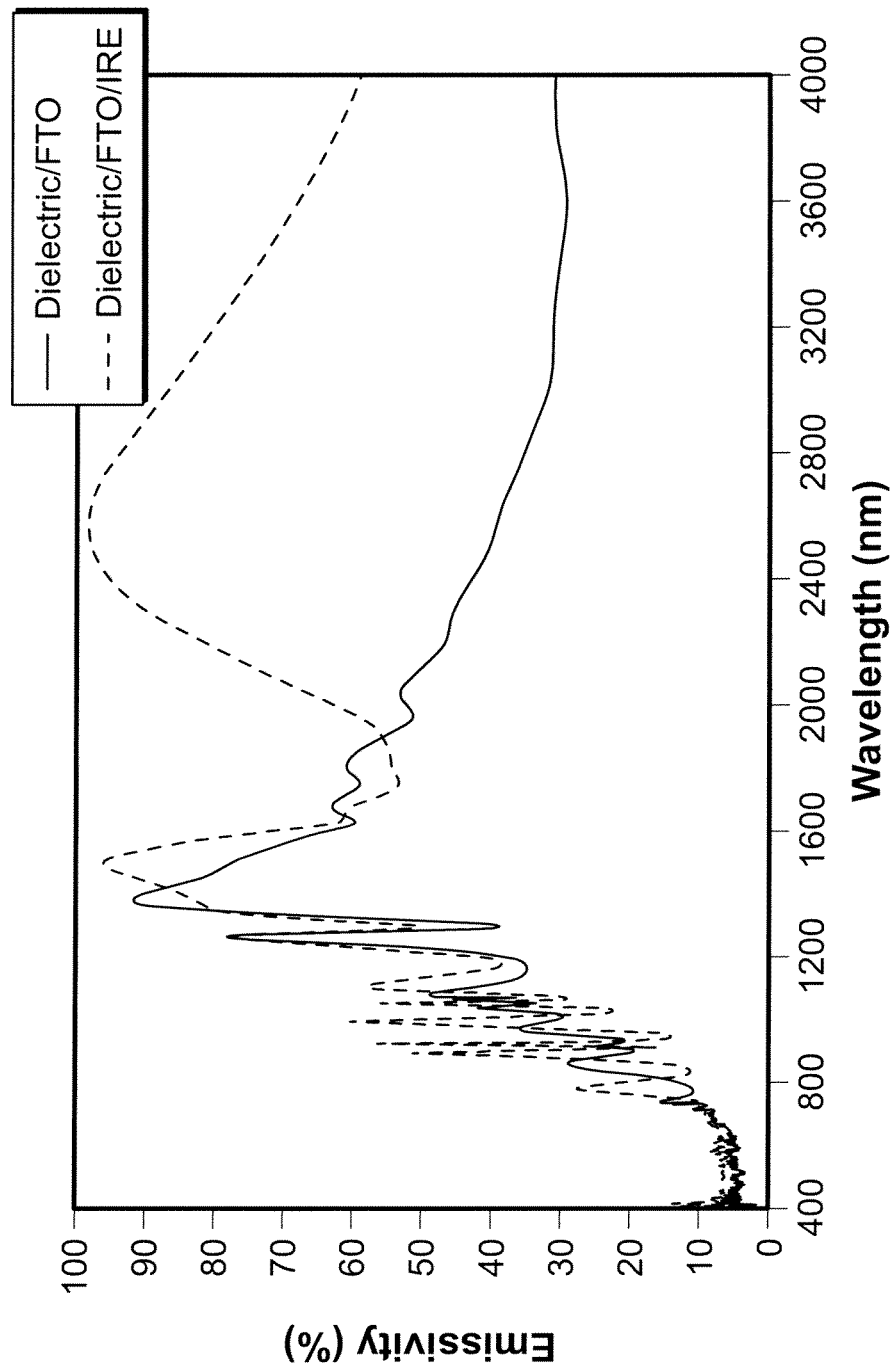
FIG. 14 is a graph depicting the emissivity of fluorine-doped tin oxide, with and without an IR-emissive overcoat of long-wave fluorine-doped tin oxide, over a wavelength range spanning from 400 to 4000 nm.

When the coating system is located on the outer surface of the lamp envelope 112, as in the embodiments of FIGS. 3-5, the coating system's outer side preferably carries a highly IR-emissive (IRE) coating. Such an IRE coating can be formed of long-wave ITO, fluorine-doped tin oxide (FTO), fluorine-doped zinc oxide (FZO), or other suitable material. The peak emissivity of the IRE material is adjusted by appropriate doping to correspond to the wavelength range of the radiation produced by a black body operating at the same temperature as the lamp envelope (e.g., 1,500 to 10,000 nm for 700° C.). This IRE coating optionally can be localized in hot spots on the envelope, to simplify the coating process. If the coating system includes a p-doped material, such as ITO, it should be overlaid by an oxygen diffusion barrier to protect it, as shown in FIG. 3. On the other hand, if the coating system includes an n-doped material, such as FTO, it should be overlaid by a diffusion barrier to prevent loss of the dopant, as shown in FIG. 4. In all cases, it is preferable to overcoat the IRE coating with a low-index, index-matching layer such as silica ($SiO_2$). FIG. 14 shows that the coating system's emissivity is increased substantially by the addition of an IRE coating formed of long-wave fluorine-doped tin oxide.

On the other hand, when the coating system is located on the inner surface of the lamp envelope 112, as in the embodiments of FIGS. 6-8, the lamp's radiation of heat can be advantageously enhanced by forming the lamp envelope of a material having high weighted average IR emissivity in the wavelength range corresponding to the wavelength range of the radiation produced by a black body operating at the same temperature as the lamp envelope (e.g., 1,500 to 10,000 nm for 700° C.). Exemplary envelope materials include alumino-silicate and borosilicate glass.

Figure 15A:
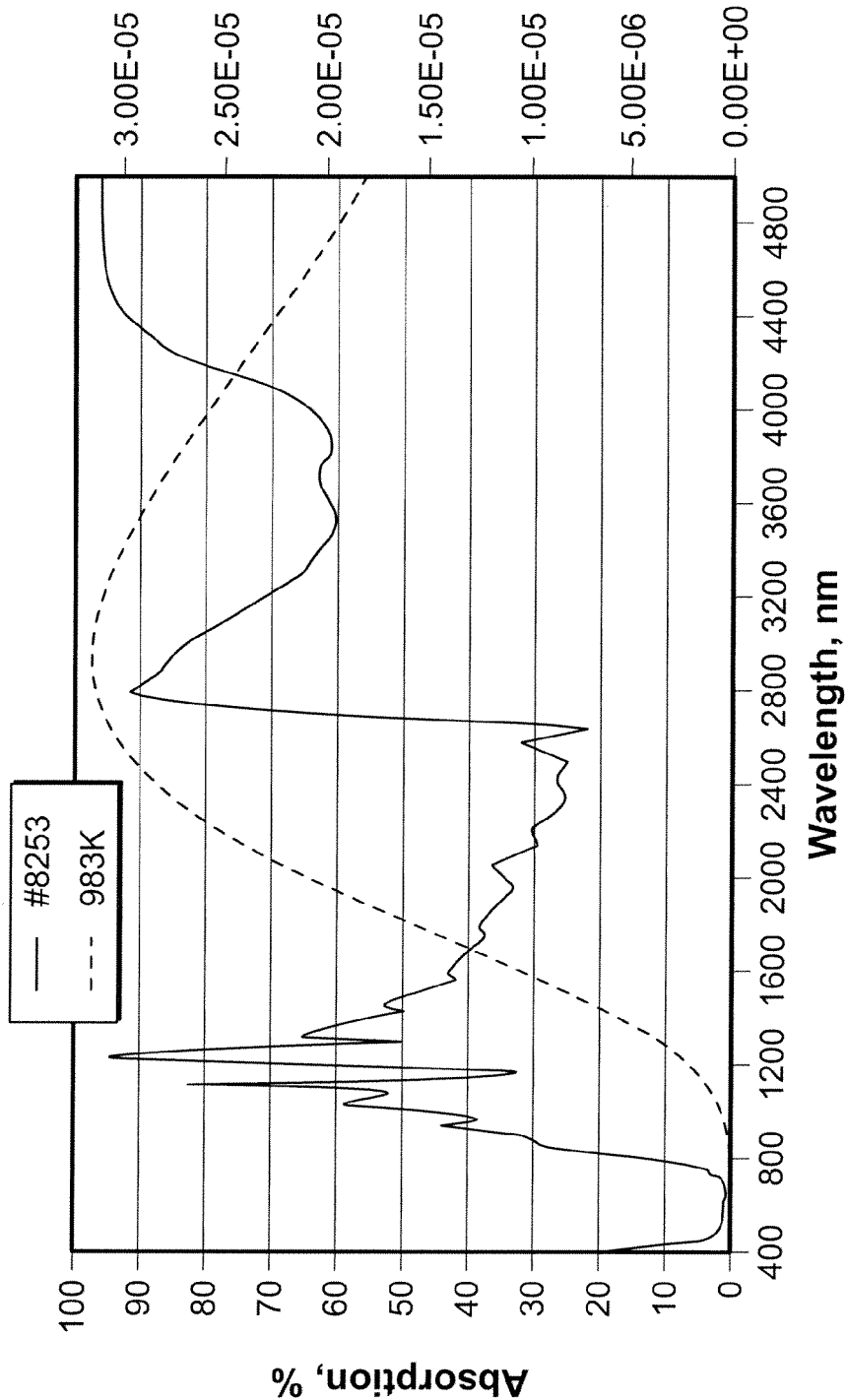
FIG. 15A is a graph depicting the emissivity of 2 mm-thick alumino-silicate glass (Schott #8253), in combination with a niobia/indium-doped tin oxide (NbO/ITO) coating, and the spectral power distribution of a black body at 983° K (710° C.). The integrated product of the two curves yields a value proportional to the energy emitted by the glass at that temperature.
Figure 15B:
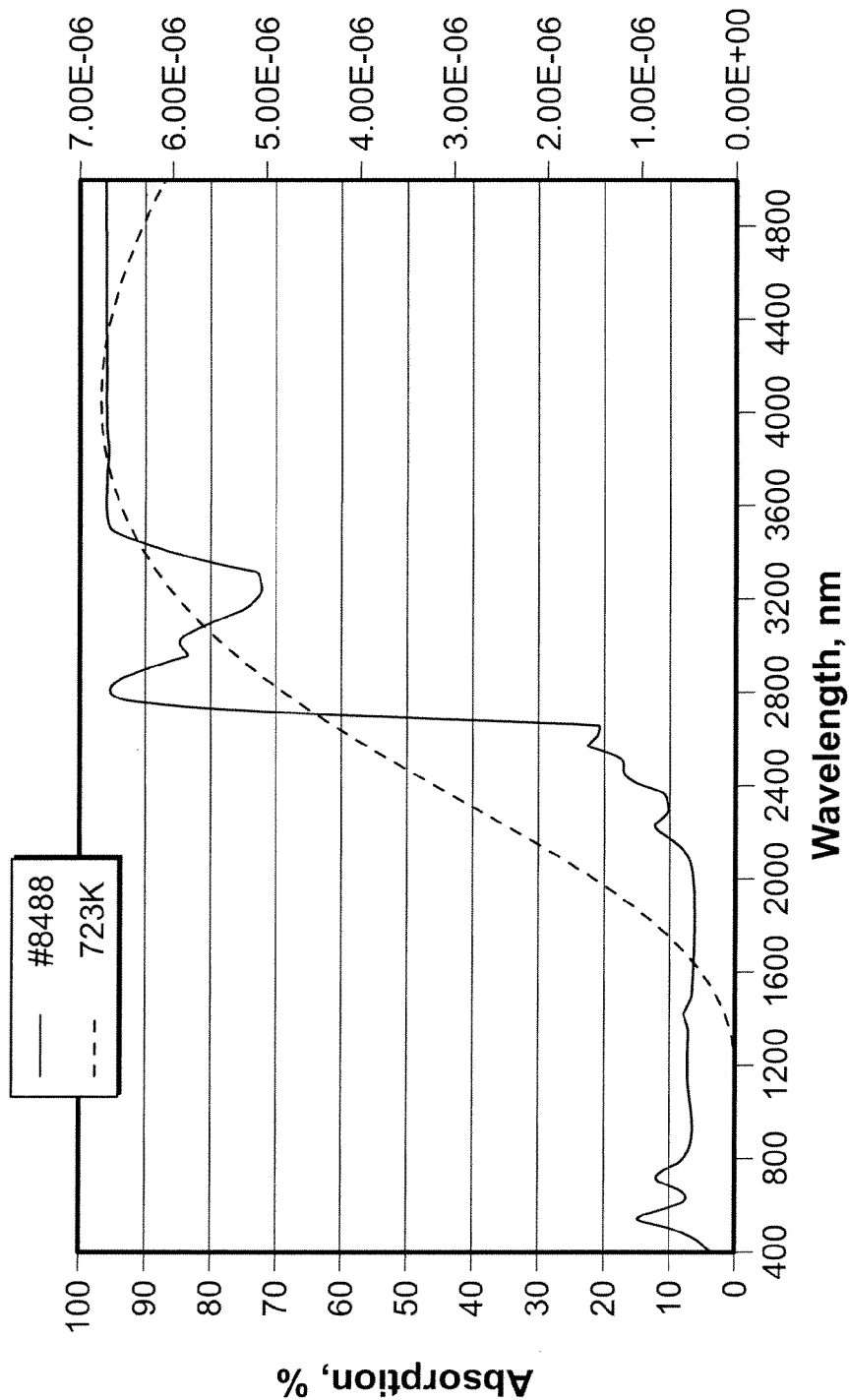
FIG. 15B is a graph similar to FIG. 15A, but for 2 mm-thick borosilicate glass (Schott #8488), in combination with a silver coating, and spectral power distribution of a black body at 723° K (450° C.).

The emissivity of an alumino-silicate glass (2 mm Schott #8253) in combination with a NbO/ITO coating (such as in FIG. 3) is shown in FIG. 15A. Note that this material has an emissivity greater than 0.60 above 2700 nm. The emissivity of a borosilicate glass (2 mm Schott #8488), in combination with a silver coating (such as in FIG. 5), is shown in FIG. 15B. Note that this material has an emissivity greater than 0.70 above 2700 nm.

Figure 16:
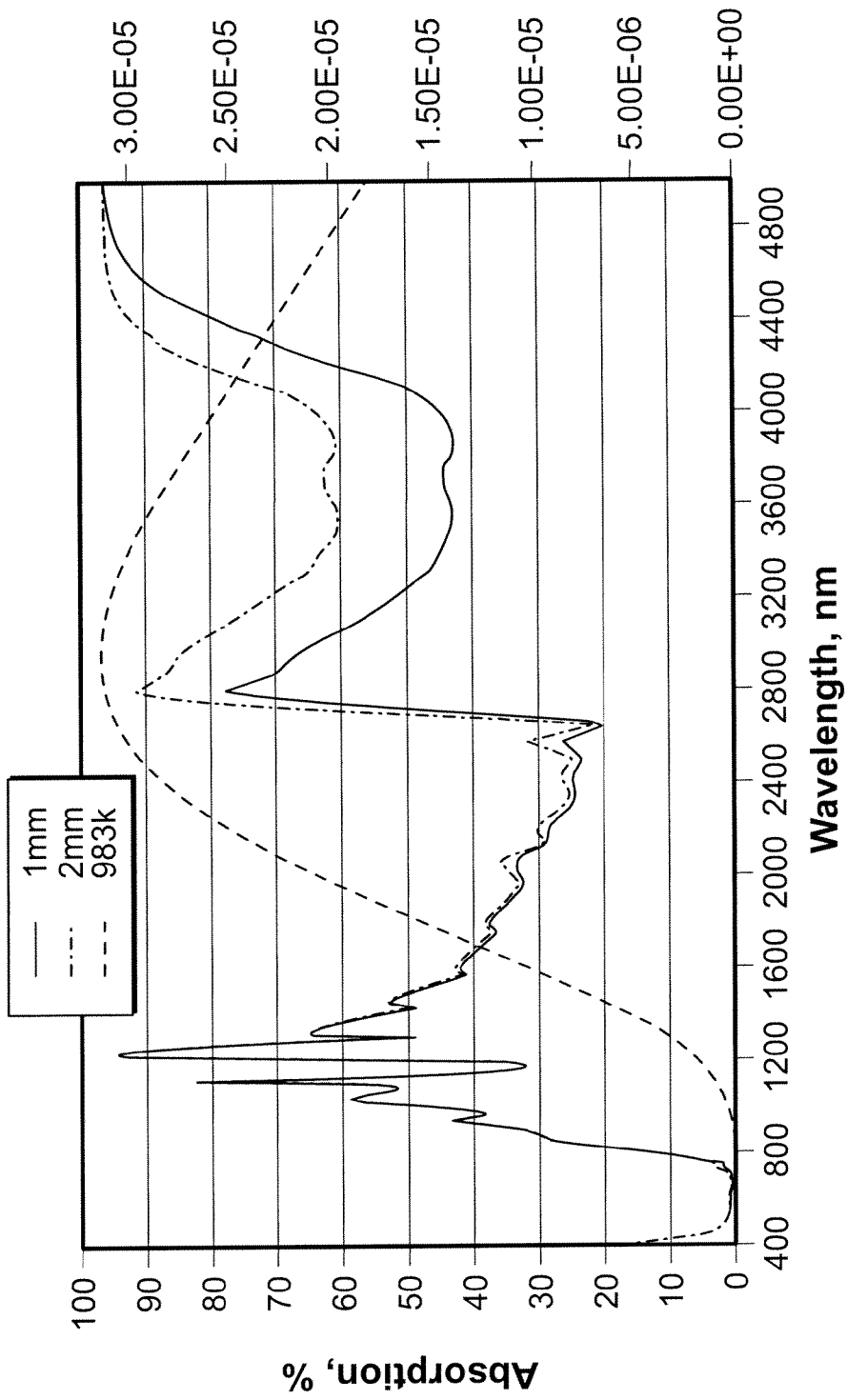
FIG. 16 is a graph depicting the emissivity of 1 mm-thick and 2 mm-thick alumino-silicate glass (Schott #8253), in combination with a 4 micron-thick coating of niobia/indium-doped tin oxide (NbO/ITO).

The lamp preferably is made as thick as possible, to increase its weighted average IR emissivity, without unduly increasing its visible absorption. The emissivity of 1 mm of coated Schott #8253 alumino-silicate glass is compared to the emissivity of 2 mm of the same coated glass in FIG. 16. Note that the emissivity of the 2 mm glass is substantially greater than the emissivity of the 1 mm glass above 2700 nm A thick envelope advantageously increases the envelope's emissivity and its outer surface area while maintaining the same filament-to-coating distance.

As mentioned above, FIGS. 3-8 depict six specific embodiments of coating systems configured in accordance with the invention. FIGS. 3-5 depict embodiments in which the coating system is deposited onto the lamp envelope's outer surface, and FIGS. 6-8 depict embodiments in which the coating system is deposited onto the lamp envelope's inner surface. Although it can be more difficult to deposit a coating system on the envelope's inner surface than on its outer surface, the resulting coating is located incrementally closer to the lamp's filament (not shown). This can increase the proportion of reflected light that impinges on the filament, where at least a portion of it is absorbed, thereby improving the lamp's luminous efficacy.

Each of FIGS. 3-8 includes three parts: (A) a schematic cross-sectional view depicting the coating system's successive layers; (B) a table setting forth the specific materials and thicknesses for each individual layer of the coating system; and (C) a graph depicting the coating system's transmission and reflection over a wavelength range spanning from 400 to 4000 nm. These six embodiments are discussed below.

With particular reference to FIG. 3A, there is shown a schematic cross-sectional view of a coating system deposited onto the outer surface of a lamp envelope formed of fused silica. The coating system includes a multi-layer dielectric coating deposited directly onto a lamp envelope, which is overlaid by a TCC in the form of ITO, and in turn by an IRE coating. A first $Si_3N_4$ oxygen diffusion barrier is located between the dielectric layer and the TCC, and a second $Si_3N_4$ oxygen diffusion barrier is located between the TCC and the IRE coating. Further, a third $Si_3N_4$ oxygen diffusion barrier is located atop the IRE coating.

FIG. 3B is a table setting forth the specific materials and thicknesses for the individual layers of the coating system of FIG. 3A. It will be noted that the dielectric coating incorporates 38 alternating layers of niobia ($Nb_2O_5$) and silica ($SiO_2$). The TCC is labeled "SWITO," which means short-wave ITO, and the IRE coating is labeled "LWITO," which means long-wave ITO. The two coatings are differentiated from each other by their dopant levels, which affects their plasma wavelengths. The TCC is preferably selected to have a plasma wavelength of less than about 1400 nm, and the IRE coating is preferably selected to have a plasma wavelength of about 3000 nm. In FIG. 3B the $Si_3N_4$ oxygen diffusion layers are depicted as combining with the SWITO to form the TCC. The combined thickness of all of the identified layers is calculated to be 5199 nm.

Figure 3C:
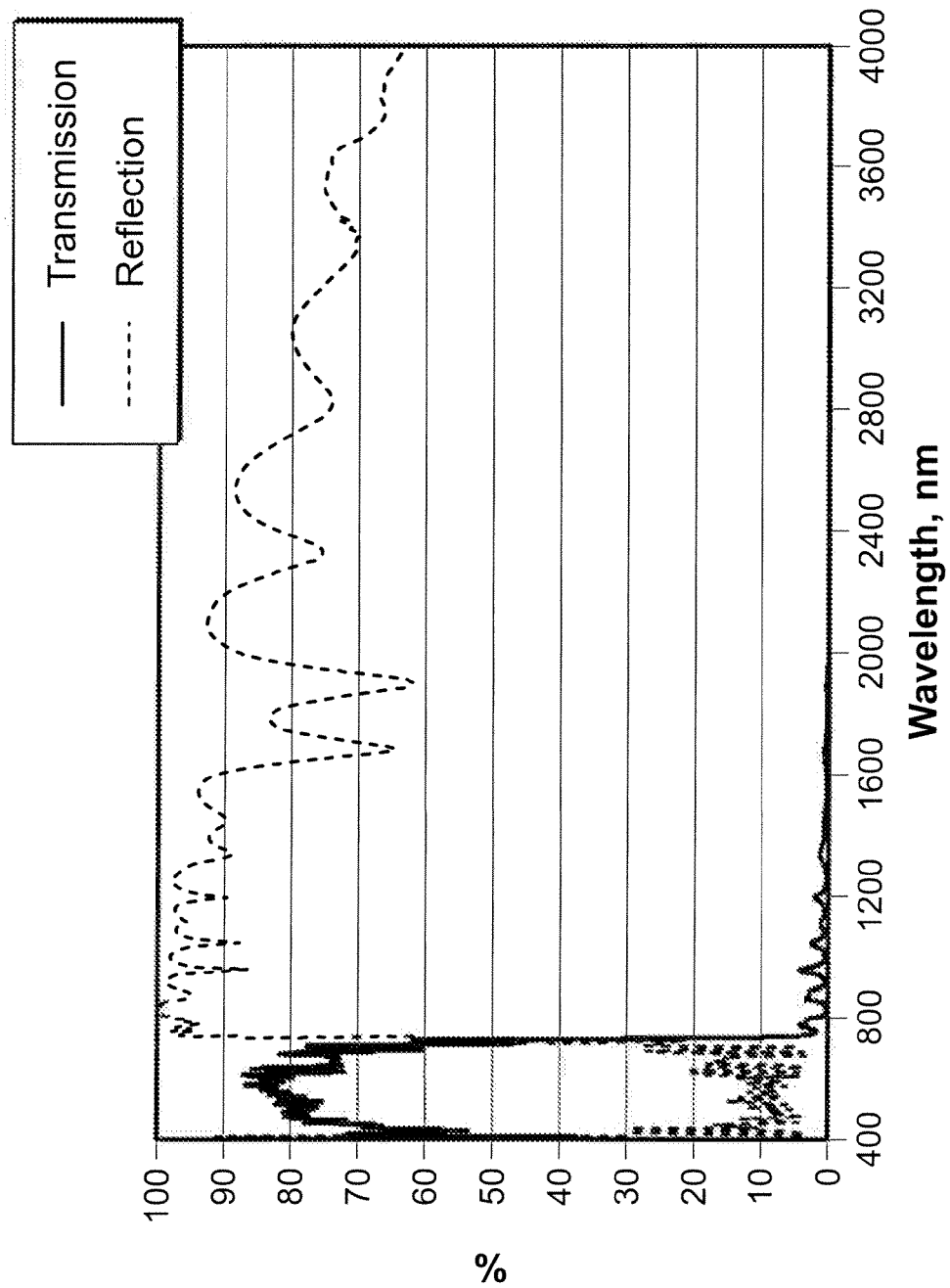
FIG. 3C is a graph depicting the transmission and reflection of the coating system of FIGS. 3A and 3B, over a wavelength range spanning from 400 to 4000 nm.

FIG. 3C is a graph depicting the coating system's transmission and reflection over a wavelength range spanning from 400 to 4000 nm. This depicted transmission and reflection are considered to represent a marked improvement in overall performance over that of a similar lamp lacking the coating system, because of a substantial increase in reflected IR radiation.

Figures 4A, 4B:
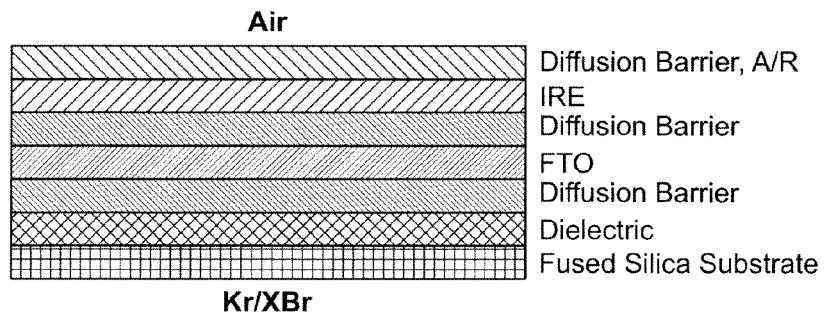
FIGS. 4A-4C are similar to FIGS. 3A-3C, but of a coating system that includes a transparent conductive coating incorporating fluorine-doped tin oxide instead of indium-doped tin oxide.
Figure 4C:
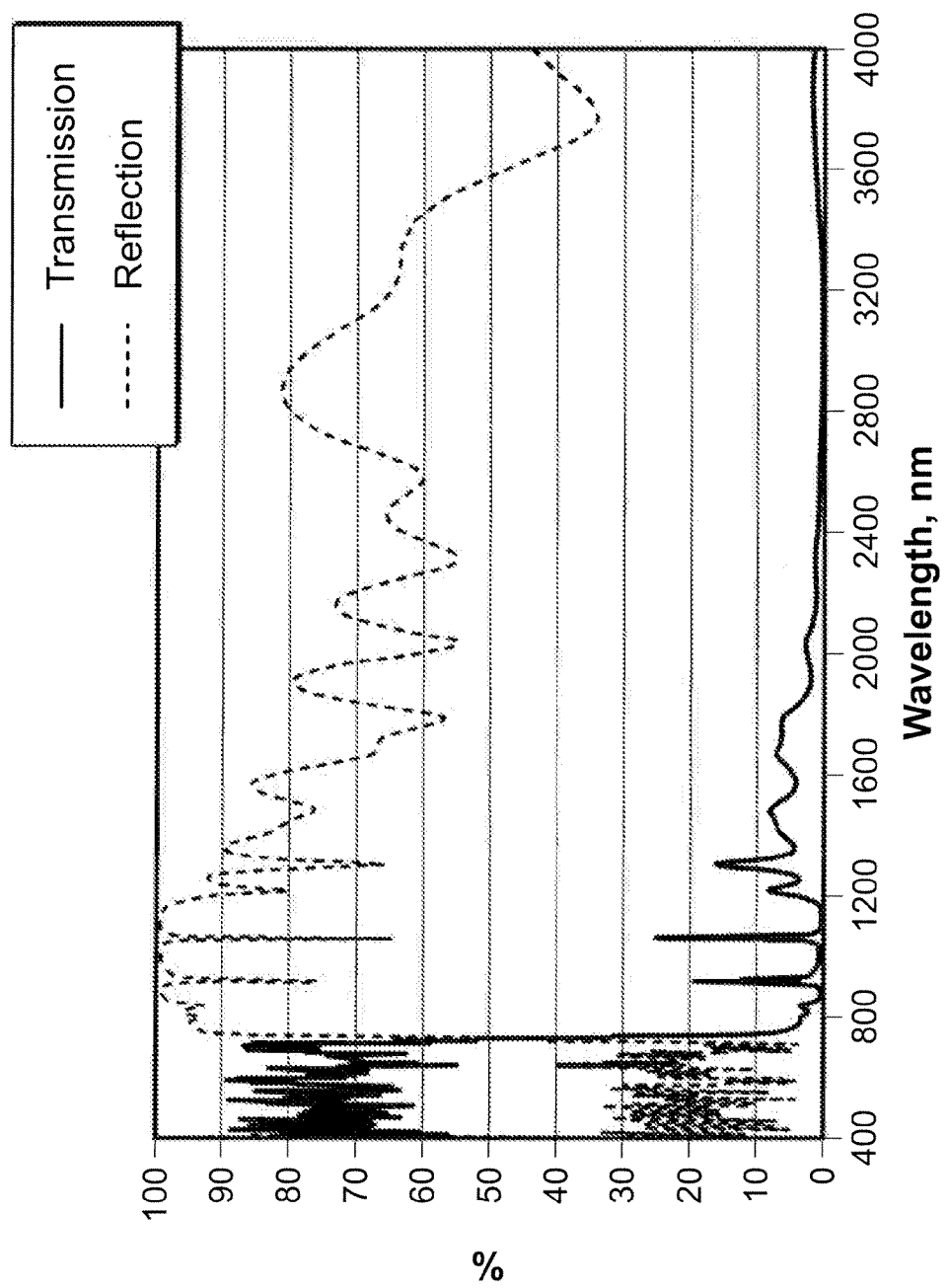

FIGS. 4A-4C are similar to FIGS. 3A-3C, but of a coating system that includes a TCC in the form of FTO instead of ITO. In this embodiment, the combined thickness of all of the layers is calculated to be 5540 nm.

Figures 5A, 5B:
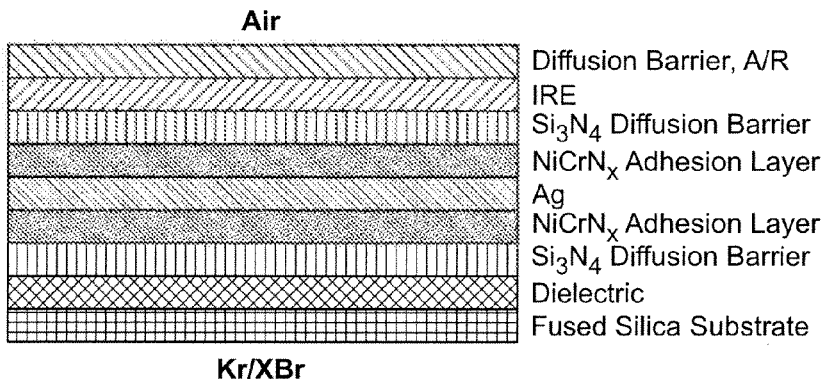
FIGS. 5A-5C are similar to FIGS. 3A-3C, but of a coating system that includes a transparent conductive coating in the form of a layer of silver instead of indium-doped tin oxide.
Figure 5C:
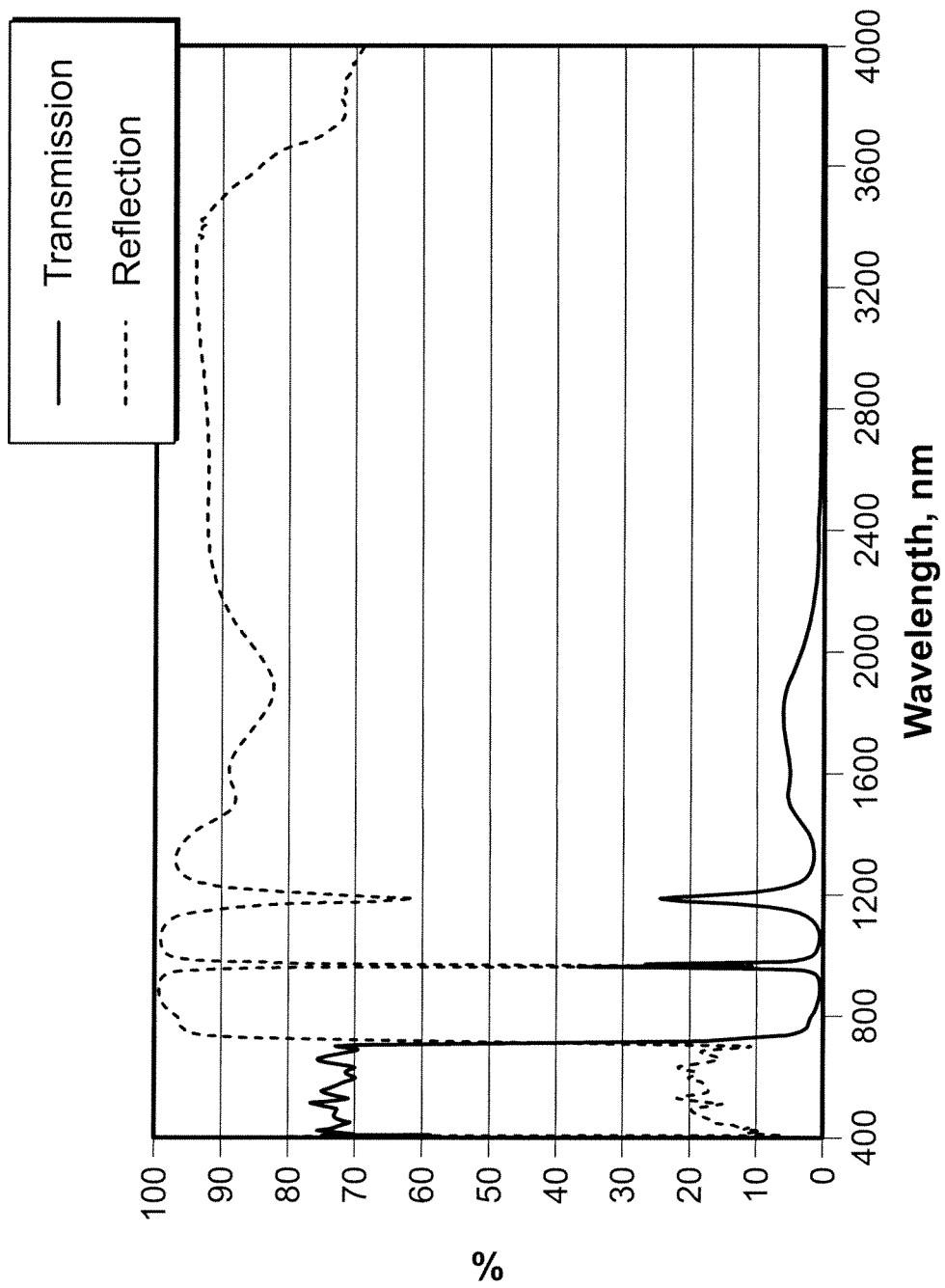

FIGS. 5A-5C are similar to FIGS. 3A-3C, but of a coating system that includes a TCC in the form of a silver layer instead of ITO. In FIG. 5B, $NiCrN_x$ adhesion layers are depicted on opposite sides of the silver layer, between the silver layer and the $Si_3N_4$ oxygen diffusion layers. In this embodiment, the combined thickness of all of the layers is calculated to be only 2891 nm.

Figure 6C:
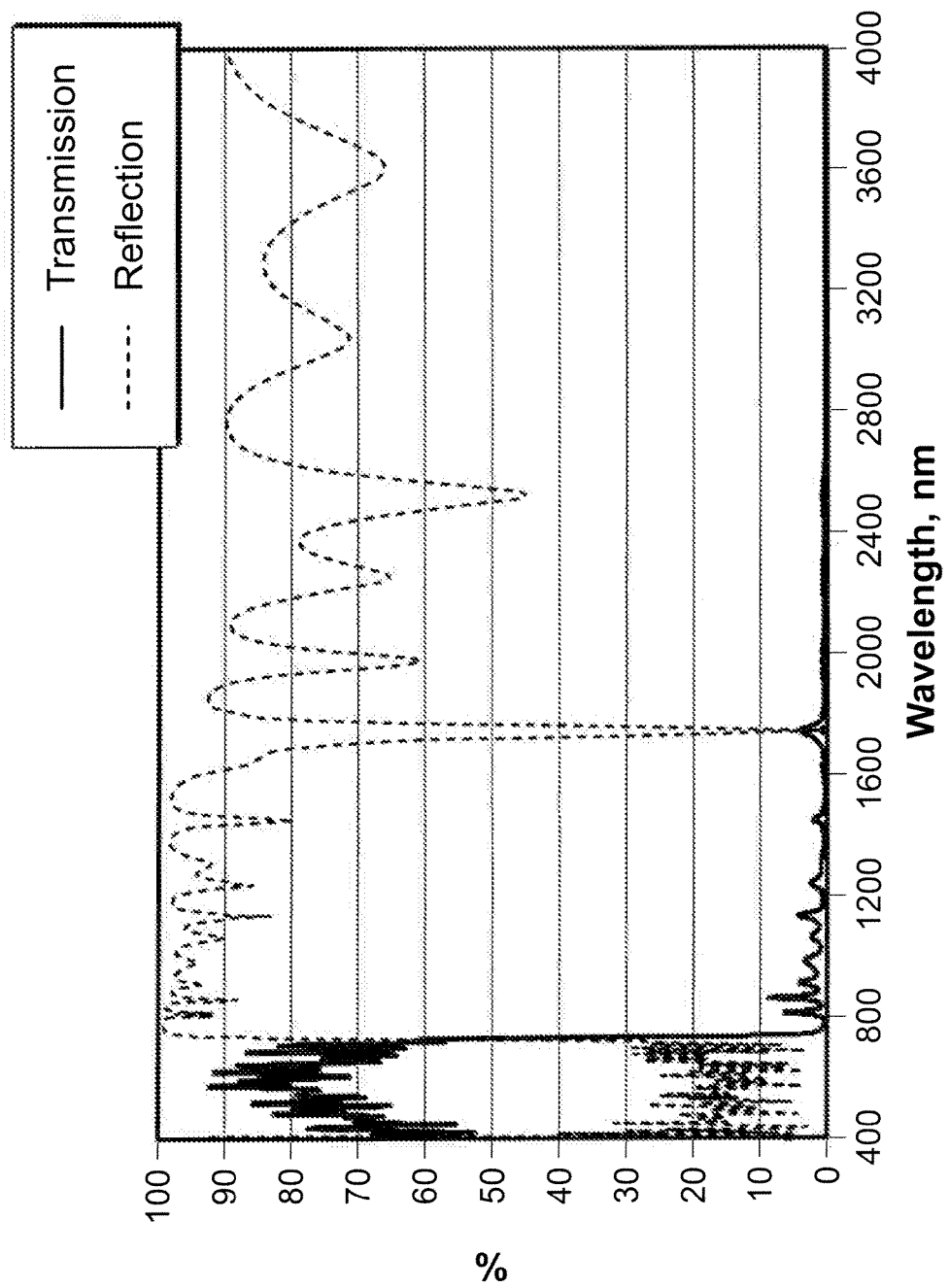

FIGS. 6A-6C are similar to FIGS. 3A-3C, but of a coating system deposited onto the inner surface of a lamp envelope. The envelope is formed of alumino-silicate glass, a material having high IR emissivity. With particular reference to FIG. 6A, the coating system is shown to include a TCC in the form of ITO deposited directly onto the lamp envelope's inner surface, which is overlaid by a multi-layer dielectric coating. A first $Si_3N_4$ oxygen diffusion barrier is located between the lamp envelope and the TCC, and a second $Si_3N_4$ oxygen diffusion barrier is located between the TCC and the dielectric coating. Further, a halogen diffusion barrier formed of $SiO_2$ is located atop the dielectric coating, to isolate that coating from the halogen gases contained within the envelope.

FIG. 6B is a table setting forth the specific materials and thicknesses for the successive layers of the coating system of FIG. 6A. It will be noted that the dielectric coating incorporates 45 alternating layers of $Nb_2O_5$ and $SiO_2$. The ITO TCC preferably is selected to have a plasma wavelength of less than about 1400 nm. In FIG. 6B, the two $Si_3N_4$ oxygen diffusion layers are depicted as combining with the ITO layer to form the TCC. The combined thickness of all of the identified layers is calculated to be 5021 nm.

FIG. 6C is a graph depicting the coating system's transmission and reflection over a wavelength range spanning from 400 to 4000 nm. This depicted transmission and reflection are considered to represent a marked improvement in overall performance over that of a similar lamp lacking a coating system.

Figure 7C:
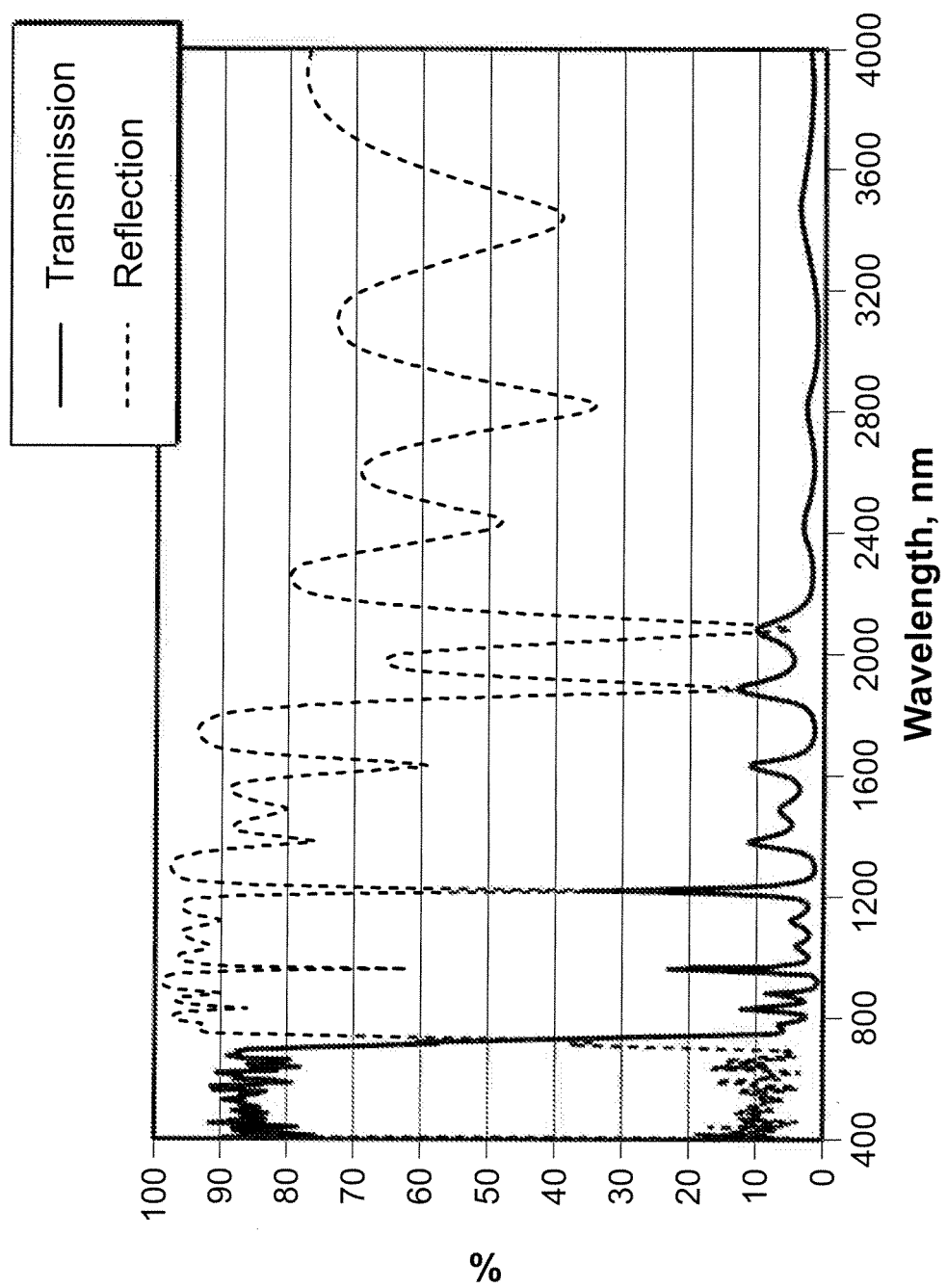

FIGS. 7A-7C are similar to FIGS. 4A-4C, but of a coating system deposited on the inner surface of the lamp envelope. In this embodiment, the combined thickness of all of the layers is calculated to be 4600 nm.

Figures 8A, 8B:
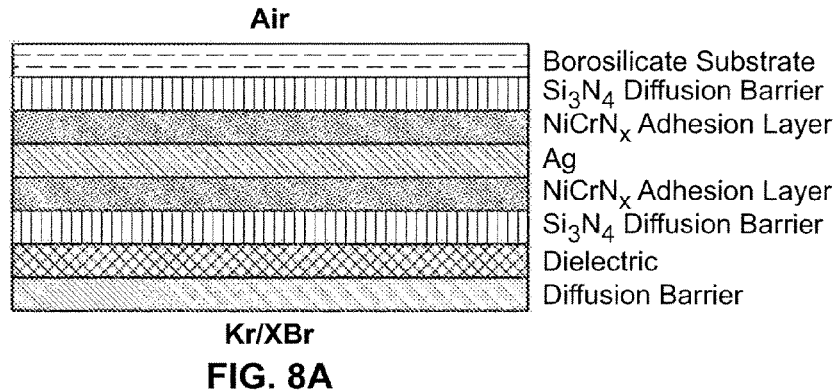
FIGS. 8A-8C are similar to FIGS. 6A-6C, but of a coating system that includes a transparent conductive coating in the form of a layer of silver instead of indium-doped tin oxide.
Figure 8C:
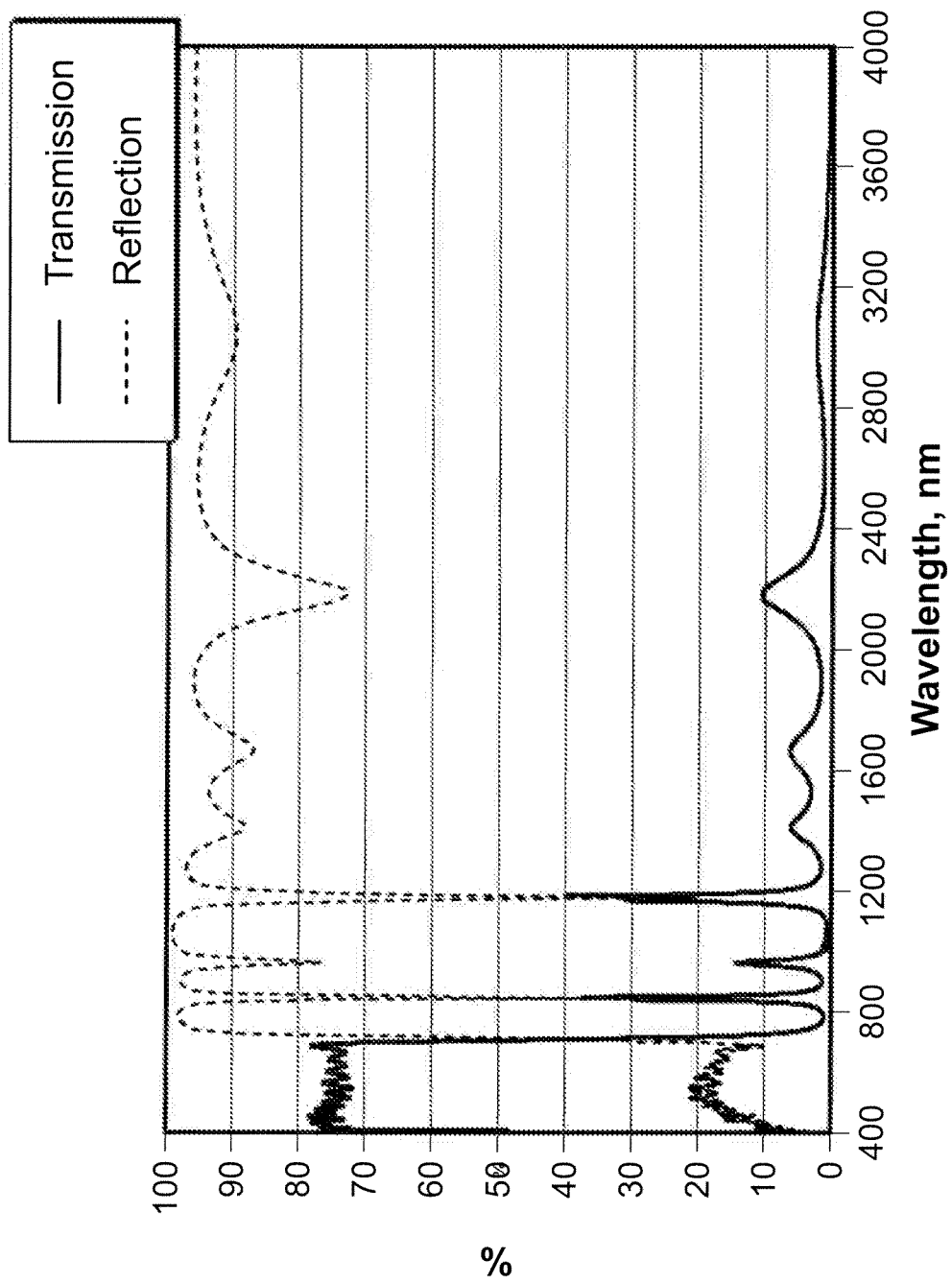

FIGS. 8A-8C are similar to FIGS. 5A-5C, but of a coating system deposited on the inner surface of the lamp envelope. In this embodiment, the combined thickness of all of the layers is calculated to be only 2096 nm.

Figure 9:
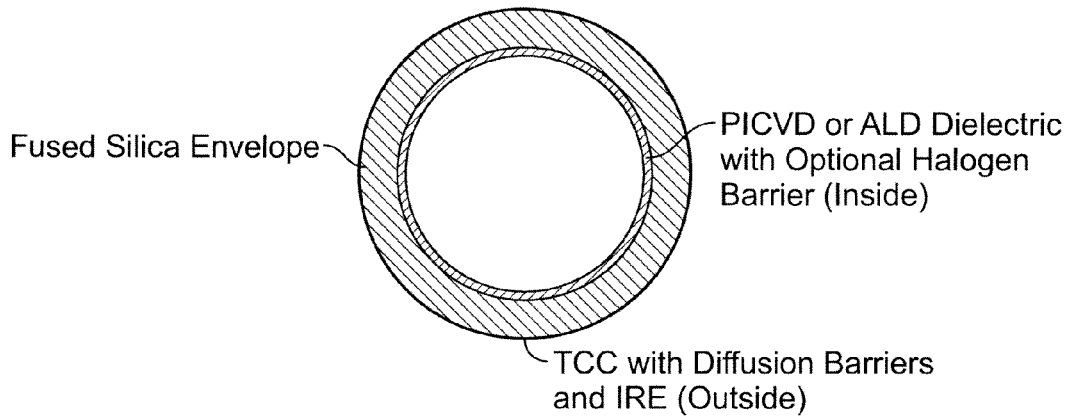
FIG. 9 is a simplified schematic cross-sectional view of another embodiment of an incandescent lamp embodying the invention, including a dielectric coating deposited on the inner surface of a lamp envelope and a TCC deposited on the outer surface of the envelope.
Figure 10:
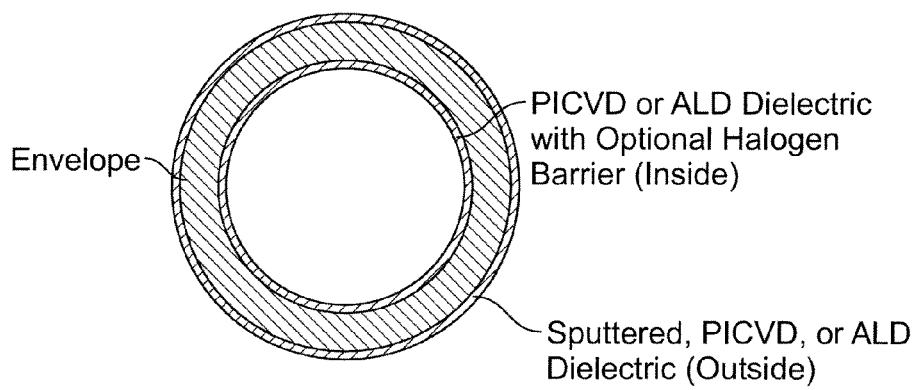
FIG. 10 is a simplified schematic cross-sectional view of yet another embodiment of an incandescent lamp embodying the invention, including a coating system that includes identical dielectric coatings deposited on both the inner surface and the outer surface of a lamp envelope.
Figure 11:
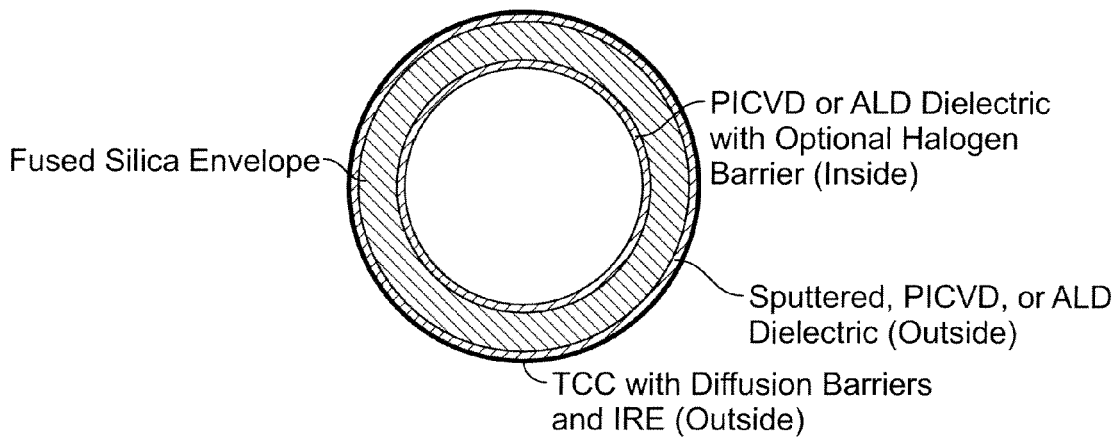
FIG. 11 is a simplified schematic cross-sectional view of yet another embodiment of an incandescent lamp embodying the invention, similar to the embodiment of FIG. 10, but including different dielectric coatings deposited on the inner and outer surfaces of a lamp envelope.

Other embodiments of the invention, depicted in FIGS. 9-11, are specific implements of coating systems disclosed in one or more of the provisional applications identified above, from which priority is being claimed. These alternative embodiments, which are discussed specifically below, incorporate a dielectric coating on the envelope's inner surface and TCC on its outer surface (FIG. 9); a two-part dielectric coating deposited on both the envelope's inner surface and its outer surface (FIG. 10); and a two-part dielectric coating deposited on both the envelope's inner surface and its outer surface with an TCC overlaying the outer surface dielectric coating (FIG. 11). All of these alternative embodiments provide an improved luminous efficacy over prior lamps, including lamps incorporating IR coatings.

In the lamp embodiment depicted schematically in FIG. 9, a dielectric coating is deposited on the inner surface of a transparent envelope and a TCC and IRE with associated diffusion barriers are deposited on the outer surface of the envelope. The plurality of layers of dielectric material comprising the dielectric coating can be deposited using any of several conventional and emerging deposition techniques. These techniques include atomic layer deposition (ALD) and plasma impulse chemical vapor deposition (PICVD), which are particularly suitable because of their special ability to uniformly coat the inside surface of complex three-dimensional shapes, without regard to line-of-sight. Persons skilled in the art are familiar with these deposition techniques.

Several important benefits can be derived by depositing the dielectric coating on the lamp envelope's inner surface and the TCC on the envelope's outer surface. One benefit is that any cracks or similar defects in the dielectric coating are isolated from the conductive coating, whereby the defects should have no effect on the conductive coating's desired optical performance. Another benefit is that the presence of the dielectric coating on the envelope's inner surface brings the coating incrementally closer to the filament than if it were located on the envelope's outer surface. This increases the proportion of reflected light that impinges on the filament, where a portion of it is absorbed, thereby increasing the lamp's luminous efficacy.

In the lamp embodiment depicted schematically in FIG. 10, the coating system includes a dielectric coating having two separate parts: an inner dielectric coating deposited onto the inner surface of a lamp envelope and an outer dielectric coating deposited onto the outer surface of the envelope. In addition, for the reasons discussed above, an optional halogen diffusion barrier preferably overlays the inner dielectric coating.

The inner and outer dielectric coatings of FIG. 10 advantageously can be made identical to each other (relative to the substrate) by depositing the two coatings simultaneously using an atomic layer deposition (ALD) process. Such a process is particularly advantageous, because of its special capability of depositing uniform layers on the outside and inside surfaces of complex three-dimensional shapes simultaneously, without regard to any required line of sight.

Such ALD inner and outer dielectric coatings have a thickness only about 65% that of an equivalent coating formed on just one surface and providing the same optical performance. This reduction in thickness allows a corresponding reduction in the time and cost of depositing such coatings. This thickness reduction also can improve the coating's effectiveness, because the magnitude of defects in the coating increase with thickness. In addition, the nature of the ALD process provides the advantage of reducing surface roughness, which reduces scattering and absorption of light and increases the lamp's luminous efficacy.

The ALD process advantageously can use inorganic precursors (e.g., chlorinated compounds), to allow deposition to occur at elevated substrate temperatures in the range of 350 to 450° C., at the mid-point of the temperature excursion of lamp envelope during operation, in order to minimize thermal stress on the coating.

Alternately, an inner and outer dielectric coating can provide a higher performance IR coating than can a dielectric coating deposited on just a single surface. When subjected to large temperature excursions, a given dielectric coating has a maximum thickness, above which it can delaminate and fail. This maximum thickness is effectively doubled by coating both the inner and outer surfaces, thereby providing a coating with increased IR reflectivity, visible transmission, and luminous efficacy.

The lamp embodiment depicted schematically in FIG. 11 is similar to the embodiment of FIG. 10, except that a TCC, IRE, and associated diffusion barriers are deposited on top of the outer dielectric coating. Preferably, the inner dielectric coating is deposited using a PICVD or ALD process, and, after the envelope has been sealed, the outer dielectric coating is deposited using either a sputtering, PICVD, or ALD process, while the previously deposited inner coating is sealed inside and protected by the lamp envelope.

In the embodiment of FIG. 11, the thickness of the outer dielectric coating preferably is maintained below a prescribed maximum value at which possible defects in the coating might adversely affect an overlaying TCC and infrared-emissive coating. The inner dielectric coating then can have whatever thickness is required to enable the combined inner and outer dielectric coatings to provide the desired level of infrared reflectivity. Depositing the outer coating using an ALD process has the advantage of reducing surface roughness and the number of defects that might adversely affect an overlying TCC.

It should be appreciated from the foregoing description that the present invention provides an improved lamp, and lighting fixture incorporating such a lamp, wherein the lamp's envelope includes a special optical coating system configured to more effectively reflect infrared light back toward the lamp filament, thereby enhancing the lamp's luminous efficacy. Multiple embodiments are disclosed, including coating systems deposited on one or both surfaces of the lamp envelope and including coating systems incorporating either a dielectric coating alone or specific combinations of a dielectric coating and a transparent conductive coating.

Although the present invention has been described in detail with reference only to the presently preferred embodiments, those skilled in the art will appreciate that various modifications can be made without departing from the invention. Accordingly, the invention is defined only by the following claims.

I claim:

1. An incandescent lamp comprising:
    a filament that, when heated, emits visible light and infrared light;
    an envelope enclosing the filament and including an inner surface facing toward the filament and an outer surface facing away from the filament; and
    a coating system deposited on the envelope and including
        a dielectric coating configured to transmit a substantial portion of visible light emitted by the filament and to reflect a substantial portion of infrared light emitted by the filament,
        a transparent conductive coating located on the side of the dielectric coating opposite the filament, wherein the transparent conductive coating is configured to transmit a substantial portion of visible light emitted by the filament and transmitted through the dielectric coating and further is configured to reflect a substantial portion of infrared light emitted by the filament and transmitted through the dielectric coating, and
        first and second oxygen diffusion barriers located on opposite sides of the transparent conductive coating, for preventing oxygen from reaching the transparent conductive coating, wherein the first and second oxygen diffusion barriers both comprise silicon nitride.

2. The incandescent lamp as defined in claim 1, wherein the dielectric coating and the transparent conductive coating both are located on the outer surface of the envelope.

3. The incandescent lamp as defined in claim 1, wherein the dielectric coating is deposited on the inner surface of the envelope.

4. The incandescent lamp as defined in claim 3, wherein:
    the lamp further comprises a halogen gas or other halogen-containing compound located within the envelope; and
    the coating system further includes a halogen diffusion barrier located adjacent to the dielectric coating, on the side of the dielectric coating nearest the filament.

5. The incandescent lamp as defined in claim 4, wherein:
    the halogen diffusion barrier is configured to substantially reduce the diffusion of a halogen gas and halogen-containing compounds located within the envelope; and
    the halogen is selected from the group consisting of bromine, iodine, and fluorine.

6. The incandescent lamp as defined in claim 5, wherein the halogen diffusion barrier comprises a material selected from the group consisting of silicon nitride, aluminum oxide, silicon dioxide, and mixtures thereof.

7. The incandescent lamp as defined in claim 1, wherein:
    the dielectric coating includes an inner dielectric coating located on the inner surface of the envelope and an outer dielectric coating located on the outer surface of the envelope; and
    the transparent conductive coating is located on the side of the outer dielectric coating facing away from the filament.

8. The incandescent lamp as defined in claim 7, wherein:
    the inner dielectric coating and the outer dielectric coating each include a plurality of dielectric layers having prescribed refractive indices and prescribed thicknesses; and
    the plurality of layers of the inner dielectric coating and the plurality of layers of the outer dielectric coating are identical to each other, relative to the envelope.

9. The incandescent lamp as defined in claim 8, wherein the inner and outer dielectric coatings are deposited simultaneously using an atomic layer deposition process.

10. The incandescent lamp as defined in claim 8, wherein the coating system further includes a halogen diffusion barrier located adjacent to the inner dielectric coating, on the side of the inner dielectric coating facing the filament.

11. The incandescent lamp as defined in claim 1, wherein the transparent conductive coating comprises a material selected from the group consisting of indium-doped tin oxide, aluminum-doped zinc oxide, titanium-doped indium oxide, fluorine-doped tin oxide, fluorine-doped zinc oxide, cadmium stannate, gold, silver, and mixtures thereof.

12. The incandescent lamp as defined in claim 1, wherein the dielectric coating comprises a plurality of dielectric layers having prescribed refractive indices and prescribed thicknesses.

13. The incandescent lamp as defined in claim 12, wherein:
    the plurality of dielectric layers comprise alternating layers of a first material having a relatively low refractive index and of a second material having a relatively high refractive index; and
    the envelope has a coefficient of thermal expansion that is equal to or greater than that of the second material.

14. The incandescent lamp as defined in claim 13, wherein:
    the second material is selected from the group consisting of niobia, titania, tantala, and mixtures thereof; and
    the envelope comprises a material selected from the group consisting of alumino-silicate and borosilicate glass.

15. The incandescent lamp as defined in claim 1, and further comprising a concave reflector integral with the envelope, for reflecting light emitted by the filament.

16. The incandescent lamp as defined in claim 1, wherein:
    the transparent conductive coating is located on the side of the envelope opposite the filament; and
    the coating system further comprises an infrared-emissive coating located on the side of the transparent conductive coating opposite the dielectric coating, wherein the infrared-emissive coating has a weighted average emissivity greater than 0.3 in the wavelength range corresponding substantially to the spectral power distribution of a black body at the temperature of the envelope, and wherein the infrared-emissive coating is configured to transmit a substantial portion of visible light transmitted through the transparent conductive coating.

17. The incandescent lamp as defined in claim 16, wherein the coating system further comprises third and fourth oxygen diffusion barriers located on opposite sides of the infrared-emissive coating, for preventing oxygen from reaching the infrared-emissive coating.

18. The incandescent lamp as defined in claim 16, wherein the coating system further includes a diffusion barrier located adjacent to the infrared-emissive coating, on the side of the infrared-emissive coating opposite the transparent conductive coating.

19. The incandescent lamp as defined in claim 16, wherein the infrared-emissive coating comprises a material selected from the group consisting of fluorine-doped tin oxide, fluorine-doped zinc oxide, tin-doped indium oxide, aluminum-doped zinc oxide, and mixtures thereof.

20. The incandescent lamp as defined in claim 1, wherein the first and second oxygen diffusion barriers both are substantially free of pinholes and trapped oxygen.

21. The incandescent lamp as defined in claim 1, wherein the transparent conductive coating comprises a p-doped semiconductor material or an n-doped semiconductor material.

22. The incandescent lamp as defined in claim 21, wherein the transparent conductive coating comprises a material selected from the group consisting of indium-doped tin oxide, aluminum-doped zinc oxide, titanium-doped indium oxide, fluorine-doped tin oxide, and fluorine-doped zinc oxide.

23. A lighting fixture comprising:
a housing;
a concave reflector mounted on the housing;
an electrical socket mounted in a prescribed position relative to the concave reflector;
an incandescent lamp including
a base configured to releasably seat in the electrical socket and to receive electrical power therefrom,
a filament that, when heated, emits visible light and infrared light,
an envelope secured to the base and cooperating with the base to enclose the filament, wherein the envelope includes an inner surface facing toward the filament and an outer surface facing away from the filament, and
a coating system deposited onto the envelope and including
a dielectric coating configured to transmit a substantial portion of visible light emitted by the filament and to reflect a substantial portion of infrared light emitted by the filament,
a transparent conductive coating located on the side of the dielectric coating opposite the filament, wherein the transparent conductive coating is configured to transmit a substantial portion of visible light emitted by the filament and transmitted through the dielectric coating and further is configured to reflect a substantial portion of infrared light emitted by the filament and transmitted through the dielectric coating, and
first and second oxygen diffusion barriers located on opposite sides of the transparent conductive coating, for preventing oxygen from reaching the transparent conductive coating, wherein the first and second oxygen diffusion barriers comprise silicon nitride.

24. The lighting fixture as defined in claim 23, wherein the dielectric coating and the transparent conductive coating of the coating system both are located on the outer surface of the envelope.

25. The lighting fixture as defined in claim 23, wherein the dielectric coating of the coating system is deposited on the inner surface of the envelope.

26. The lighting fixture as defined in claim 23, wherein the dielectric coating includes an inner dielectric coating located on the inner surface of the envelope and an outer dielectric coating located on the outer surface of the envelope.

27. The lighting fixture as defined in claim 23, wherein the transparent conductive coating comprises a material selected from the group consisting of indium-doped tin oxide, aluminum-doped zinc oxide, titanium-doped indium oxide, fluorine-doped tin oxide, fluorine-doped zinc oxide, cadmium stannate, gold, silver, and mixtures thereof.

28. The lighting fixture as defined in claim 23, wherein the dielectric coating comprises a plurality of dielectric layers having prescribed refractive indices and prescribed thicknesses.

29. The lighting fixture as defined in claim 23, wherein:
the transparent conductive coating of the coating system is located on the side of the envelope opposite the filament; and
the coating system further comprises an infrared-emissive coating located on the side of the transparent conductive coating opposite the dielectric coating, wherein the infrared-emissive coating has a weighted average emissivity greater than 0.3 in the wavelength range corresponding substantially to the spectral power distribution of a black body at the temperature of the envelope, and wherein the infrared-emissive coating is configured to transmit a substantial portion of visible light transmitted through the transparent conductive coating.

30. The lighting fixture as defined in claim 29, wherein the coating system further comprises third and fourth oxygen diffusion barriers located on opposite sides of the infrared-emissive coating, for preventing oxygen from reaching the infrared-emissive coating.

31. The lighting fixture as defined in claim 23, wherein the first and second oxygen diffusion barriers of the incandescent lamp both are substantially free of pinholes and trapped oxygen.

32. The lighting fixture as defined in claim 23, wherein the transparent conductive coating of the coating system comprises a p-doped semiconductor material or an n-doped semiconductor material.

33. The lighting fixture as defined in claim 32, wherein the transparent conductive coating of the coating system comprises a material selected from the group consisting of indium-doped tin oxide, aluminum-doped zinc oxide, titanium-doped indium oxide, fluorine-doped tin oxide, and fluorine-doped zinc oxide.

* * * * *